(12) United States Patent
Duesel, Jr. et al.

(10) Patent No.: US 8,801,897 B2
(45) Date of Patent: Aug. 12, 2014

(54) COMPACT WASTEWATER CONCENTRATOR AND CONTAMINANT SCRUBBER

(75) Inventors: Bernard F. Duesel, Jr., Goshen, NY (US); Michael J. Rutsch, Tulsa, OK (US); Craig Clerkin, Stoughton, WI (US)

(73) Assignee: Heartland Technology Partners LLC, St Louis, MO (US)

( * ) Notice: Subject to any disclaimer, the term of this patent is extended or adjusted under 35 U.S.C. 154(b) by 771 days.

(21) Appl. No.: 12/938,879

(22) Filed: Nov. 3, 2010

(65) Prior Publication Data

US 2011/0100924 A1  May 5, 2011

Related U.S. Application Data

(63) Continuation-in-part of application No. 12/846,337, filed on Jul. 29, 2010, which is a continuation-in-part of application No. 12/705,462, filed on Feb. 12, 2010, now Pat. No. 8,568,557, and a continuation-in-part of application No. 12/530,484, filed as application No. PCT/US2008/056702 on Mar. 12, 2008.

(60) Provisional application No. 61/152,248, filed on Feb. 12, 2009, provisional application No. 61/229,650, filed on Jul. 29, 2009, provisional application No. 60/906,743, filed on Mar. 13, 2007.

(51) Int. Cl.
*B01D 1/14* (2006.01)

(52) U.S. Cl.
USPC ........ 159/47.3; 159/16.2; 159/47.1; 210/719; 210/747.8; 261/77; 261/121.1; 261/123; 203/12; 203/28

(58) Field of Classification Search
CPC .......... B01D 1/14; B01D 1/24; B01D 1/2818; B01D 1/305; B01D 21/0039; C02F 1/04; C02F 1/048

USPC ........... 159/16.2, 47.1, 47.3; 210/719, 747.8; 261/77, 121.1, 123; 203/12, 28

See application file for complete search history.

(56) References Cited

U.S. PATENT DOCUMENTS

| 2,372,846 | A | 4/1945 | Frederick et al. |
| 2,387,818 | A | 10/1945 | Wethly |

(Continued)

FOREIGN PATENT DOCUMENTS

| CL | 757-2004 | 5/2007 |
| DE | 556 455 C | 8/1932 |

(Continued)

OTHER PUBLICATIONS

International Preliminary Report on Patentability for Application No. PCT/US2010/043647, dated Feb. 9, 2012.

(Continued)

*Primary Examiner* — Nina Bhat
(74) *Attorney, Agent, or Firm* — Marshall, Gerstein & Borun LLP

(57) ABSTRACT

A compact and portable liquid concentrator and contaminant scrubber includes a gas inlet, a gas exit and a flow corridor connecting the gas inlet and the gas exit, wherein the flow corridor includes a narrowed portion that accelerates the gas through the flow corridor. A liquid inlet injects liquid into the gas stream at a point prior to the narrowed portion so that the gas-liquid mixture is thoroughly mixed within the flow corridor, causing a portion of the liquid to be evaporated. A demister or fluid scrubber downstream of the narrowed portion removes entrained liquid droplets from the gas stream and re-circulates the removed liquid to the liquid inlet through a re-circulating circuit. A reagent may be mixed with the liquid to react with contaminants in the liquid.

20 Claims, 4 Drawing Sheets

(56) References Cited

U.S. PATENT DOCUMENTS

| | | |
|---|---|---|
| 2,468,455 A | 4/1949 | Metziger |
| 2,560,226 A | 7/1951 | Joos et al. |
| 2,619,421 A | 11/1952 | Greenfield |
| 2,651,647 A | 9/1953 | Greenfield |
| 2,658,349 A | 11/1953 | Keller |
| 2,658,735 A | 11/1953 | Ybarrondo |
| 2,721,065 A | 10/1955 | Ingram |
| 2,790,506 A | 4/1957 | Vactor |
| 2,867,972 A | 1/1959 | Hokderreed at al. |
| 2,879,838 A | 3/1959 | Flynt et al. |
| 2,890,166 A | 6/1959 | Heinze |
| 2,911,421 A | 11/1959 | Greenfield |
| 2,911,423 A | 11/1959 | Greenfield |
| 2,979,408 A | 4/1961 | Greenfield |
| 2,981,250 A | 4/1961 | Steward |
| 3,060,921 A | 10/1962 | Luring et al. |
| 3,076,715 A | 2/1963 | Greenfield |
| 3,203,875 A | 8/1965 | Harris |
| 3,211,538 A | 10/1965 | Gross et al. |
| 3,212,235 A | 10/1965 | Markant |
| 3,251,398 A | 5/1966 | Greenfield |
| 3,284,064 A | 11/1966 | Kolm et al. |
| 3,299,651 A | 1/1967 | McGrath |
| 3,304,991 A | 2/1967 | Greenfield |
| 3,306,039 A | 2/1967 | Peterson |
| 3,323,575 A | 6/1967 | Greenfield |
| 3,405,918 A | 10/1968 | Calaceto et al. |
| 3,432,399 A | 3/1969 | Schutt |
| 3,539,549 A | 11/1970 | Greenfield |
| 3,578,892 A | 5/1971 | Wilkinson |
| 3,601,374 A | 8/1971 | Wheeler |
| 3,638,924 A | 2/1972 | Calaceto et al. |
| 3,713,786 A | 1/1973 | Umstead |
| 3,716,458 A | 2/1973 | Greenfield et al. |
| 3,730,673 A | 5/1973 | Straitz, III |
| 3,743,483 A | 7/1973 | Shah |
| 3,754,869 A | 8/1973 | Van Raden |
| 3,756,580 A | 9/1973 | Dunn |
| 3,756,893 A | 9/1973 | Smith |
| 3,762,893 A | 10/1973 | Larsen |
| 3,782,300 A | 1/1974 | White et al. |
| 3,789,902 A | 2/1974 | Shah et al. |
| 3,826,096 A | 7/1974 | Hrusch |
| 3,838,974 A | 10/1974 | Hemsath et al. |
| 3,838,975 A | 10/1974 | Tabak |
| 3,840,002 A | 10/1974 | Douglas et al. |
| 3,855,079 A | 12/1974 | Greenfield et al. |
| 3,870,585 A | 3/1975 | Kearns et al. |
| 3,876,490 A | 4/1975 | Tsuruta |
| 3,880,756 A | 4/1975 | Raineri et al. |
| 3,898,134 A | 8/1975 | Greenfield et al. |
| 3,901,643 A | 8/1975 | Reed et al. |
| 3,915,620 A | 10/1975 | Reed |
| 3,917,508 A | 11/1975 | Greenfield et al. |
| 3,925,148 A | 12/1975 | Erwin |
| 3,944,215 A | 3/1976 | Beck |
| 3,945,331 A | 3/1976 | Drake et al. |
| 3,947,215 A | 3/1976 | Peterson et al. |
| 3,947,327 A | 3/1976 | Greenfield et al. |
| 3,950,230 A | 4/1976 | Greenfield et al. |
| 3,994,671 A | 11/1976 | Straitz, III |
| 4,001,077 A | 1/1977 | Kemper |
| 4,007,094 A | 2/1977 | Greenfield et al. |
| 4,012,191 A | 3/1977 | Lisankie et al. |
| 4,013,516 A | 3/1977 | Greenfield et al. |
| 4,026,682 A | 5/1977 | Pausch |
| 4,036,576 A | 7/1977 | McCracken |
| 4,070,423 A | 1/1978 | Pierce |
| 4,079,585 A | 3/1978 | Helleur |
| 4,080,883 A | 3/1978 | Zink et al. |
| 4,092,908 A | 6/1978 | Straitz, III |
| 4,118,173 A | 10/1978 | Shakiba |
| 4,119,538 A | 10/1978 | Yamauchi et al. |
| 4,140,471 A | 2/1979 | Straitz, III et al. |
| 4,154,570 A | 5/1979 | Schwartz |
| 4,157,239 A | 6/1979 | Reed |
| 4,181,173 A | 1/1980 | Pringle |
| 4,185,685 A | 1/1980 | Giberson |
| 4,198,198 A | 4/1980 | Straitz, III |
| 4,227,897 A | 10/1980 | Reed |
| 4,230,536 A | 10/1980 | Sech |
| 4,257,746 A | 3/1981 | Wells |
| 4,259,185 A | 3/1981 | Mixon |
| 4,264,826 A | 4/1981 | Ullmann |
| 4,270,974 A | 6/1981 | Greenfield et al. |
| 4,276,115 A | 6/1981 | Greenfield et al. |
| 4,285,578 A | 8/1981 | Yamashita et al. |
| 4,300,924 A | 11/1981 | Coyle |
| 4,306,858 A | 12/1981 | Simon |
| 4,336,101 A | 6/1982 | Greenfield et al. |
| 4,346,660 A | 8/1982 | McGill |
| RE31,185 E | 3/1983 | Greenfield et al. |
| 4,430,046 A | 2/1984 | Cirrito |
| 4,432,914 A | 2/1984 | Schifftner |
| 4,440,098 A | 4/1984 | Adams |
| 4,445,464 A | 5/1984 | Gerstmann et al. |
| 4,445,842 A | 5/1984 | Syska |
| 4,450,901 A | 5/1984 | Janssen |
| 4,485,746 A | 12/1984 | Erlandsson |
| 4,496,314 A | 1/1985 | Clarke |
| 4,518,458 A | 5/1985 | Greenfield et al. |
| 4,538,982 A | 9/1985 | McGill et al. |
| 4,583,936 A | 4/1986 | Krieger |
| 4,608,120 A | 8/1986 | Greenfield et al. |
| 4,613,409 A | 9/1986 | Volland |
| 4,648,973 A | 3/1987 | Hultholm et al. |
| 4,652,233 A | 3/1987 | Hamazaki et al. |
| 4,658,736 A | 4/1987 | Walter |
| 4,683,062 A | 7/1987 | Krovak et al. |
| 4,693,304 A | 9/1987 | Volland |
| 4,771,708 A | 9/1988 | Douglass, Jr. |
| 4,838,184 A | 6/1989 | Young et al. |
| 4,863,644 A | 9/1989 | Harrington et al. |
| 4,882,009 A | 11/1989 | Santoleri et al. |
| 4,890,672 A | 1/1990 | Hall |
| 4,909,730 A | 3/1990 | Roussakis et al. |
| 4,913,065 A | 4/1990 | Hemsath |
| 4,938,899 A | 7/1990 | Oros et al. |
| 4,952,137 A | 8/1990 | Schwartz et al. |
| 4,961,703 A | 10/1990 | Morgan |
| 5,009,511 A | 4/1991 | Sarko et al. |
| 5,030,428 A | 7/1991 | Dorr et al. |
| 5,032,230 A | 7/1991 | Shepherd |
| 5,068,092 A | 11/1991 | Aschauer |
| 5,076,895 A | 12/1991 | Greenfield et al. |
| 5,132,090 A | 7/1992 | Volland |
| 5,154,898 A | 10/1992 | Ajinkya et al. |
| 5,176,798 A | 1/1993 | Rodden |
| 5,183,563 A | 2/1993 | Rodden |
| 5,238,580 A | 8/1993 | Singhvi |
| 5,279,356 A | 1/1994 | Bruhn |
| 5,279,646 A | 1/1994 | Schwab |
| 5,336,284 A | 8/1994 | Schifftner |
| 5,342,482 A * | 8/1994 | Duesel, Jr. .................. 159/16.2 |
| D350,838 S | 9/1994 | Johnson |
| 5,347,958 A | 9/1994 | Gordon, Jr. |
| 5,460,511 A | 10/1995 | Grahn |
| 5,484,471 A | 1/1996 | Schwab |
| 5,512,085 A | 4/1996 | Schwab |
| 5,527,984 A | 6/1996 | Stultz et al. |
| 5,585,005 A | 12/1996 | Smith et al. |
| 5,630,913 A | 5/1997 | Tajer-Ardebili |
| 5,632,864 A | 5/1997 | Enneper |
| 5,636,623 A | 6/1997 | Panz et al. |
| 5,656,155 A | 8/1997 | Norcross et al. |
| 5,662,802 A | 9/1997 | Heins et al. |
| 5,695,614 A | 12/1997 | Hording et al. |
| 5,695,643 A | 12/1997 | Brandt et al. |
| 5,735,680 A | 4/1998 | Henkelmann |
| 5,749,719 A | 5/1998 | Rajewski |
| 5,759,233 A * | 6/1998 | Schwab .............................. 95/8 |
| 5,810,578 A | 9/1998 | Hystad et al. |
| 5,879,563 A | 3/1999 | Garbutt |
| 5,925,223 A | 7/1999 | Simpson et al. |

(56) References Cited

U.S. PATENT DOCUMENTS

| | | |
|---|---|---|
| 5,934,207 A | 8/1999 | Echols et al. |
| 5,968,320 A | 10/1999 | Sprague |
| 5,968,352 A | 10/1999 | Ditzler |
| 6,007,055 A | 12/1999 | Schifftner |
| 6,149,137 A | 11/2000 | Johnson et al. |
| 6,250,916 B1 | 6/2001 | Philippe et al. |
| 6,276,872 B1 | 8/2001 | Schmitt |
| 6,293,277 B1 | 9/2001 | Panz et al. |
| 6,332,949 B1 | 12/2001 | Beckhaus et al. |
| 6,345,495 B1 | 2/2002 | Cummings |
| 6,383,260 B1 | 5/2002 | Schwab |
| 6,391,100 B1 | 5/2002 | Hogan |
| 6,391,149 B1 | 5/2002 | Calfee et al. |
| 6,402,816 B1 | 6/2002 | Trivett et al. |
| 6,435,860 B1 | 8/2002 | Brookshire et al. |
| 6,485,548 B1 | 11/2002 | Hogan |
| 6,500,216 B1 | 12/2002 | Takayasu |
| 6,616,733 B1 | 9/2003 | Pellegrin |
| 6,632,083 B1 | 10/2003 | Bussman et al. |
| 6,719,829 B1 | 4/2004 | Schwab |
| 6,733,636 B1 | 5/2004 | Heins |
| 6,742,337 B1 | 6/2004 | Hays et al. |
| 6,913,671 B2 | 7/2005 | Bolton et al. |
| 6,919,000 B2 | 7/2005 | Klausner et al. |
| 6,926,757 B2 | 8/2005 | Kalliokoski et al. |
| 6,936,140 B2 | 8/2005 | Paxton et al. |
| 7,073,337 B2 | 7/2006 | Mangin |
| 7,074,339 B1 | 7/2006 | Mims |
| 7,077,201 B2 | 7/2006 | Heins |
| 7,111,673 B2 | 9/2006 | Hugill |
| 7,142,298 B2 | 11/2006 | Nuspliger |
| 7,144,555 B1 | 12/2006 | Squires et al. |
| 7,150,320 B2 | 12/2006 | Heins |
| 7,156,985 B1 | 1/2007 | Frisch |
| 7,166,188 B2 | 1/2007 | Kedem et al. |
| 7,214,290 B2 * | 5/2007 | Duesel et al. .............. 159/16.2 |
| 7,225,620 B2 | 6/2007 | Klausner et al. |
| 7,332,010 B2 | 2/2008 | Steiner |
| 7,402,247 B2 | 7/2008 | Sutton |
| 7,416,172 B2 * | 8/2008 | Duesel et al. .................. 261/77 |
| 7,416,177 B2 | 8/2008 | Suzuki et al. |
| 7,424,999 B2 | 9/2008 | Xu et al. |
| 7,428,926 B2 | 9/2008 | Heins |
| 7,438,129 B2 | 10/2008 | Heins |
| 7,442,035 B2 | 10/2008 | Duesel, Jr. et al. |
| 7,459,135 B2 | 12/2008 | Pieterse et al. |
| 7,572,626 B2 | 8/2009 | Frisch et al. |
| 7,591,309 B2 | 9/2009 | Minnich et al. |
| 7,614,367 B1 | 11/2009 | Frick |
| 7,681,643 B2 | 3/2010 | Heins |
| 7,717,174 B2 | 5/2010 | Heins |
| 7,758,819 B2 | 7/2010 | Nagelhout |
| 7,832,714 B2 | 11/2010 | Duesel, Jr. et al. |
| 7,967,955 B2 * | 6/2011 | Heins ........................... 203/12 |
| 8,066,844 B2 * | 11/2011 | Duesel et al. .............. 159/16.2 |
| 8,066,845 B2 * | 11/2011 | Duesel et al. .............. 159/16.2 |
| 8,136,797 B2 | 3/2012 | Duesel, Jr. et al. |
| 8,158,097 B2 * | 4/2012 | DiTommaso et al. ......... 423/497 |
| 8,529,155 B2 * | 9/2013 | DiTommaso et al. .... 405/129.27 |
| 8,568,557 B2 * | 10/2013 | Duesel et al. .............. 159/16.2 |
| 2001/0013666 A1 | 8/2001 | Nomura et al. |
| 2002/0069838 A1 | 6/2002 | Rautenbach et al. |
| 2003/0104778 A1 | 6/2003 | Liu |
| 2003/0127226 A1 | 7/2003 | Heins |
| 2004/0031424 A1 | 2/2004 | Pope |
| 2004/0040671 A1 | 3/2004 | Duesel et al. |
| 2004/0045681 A1 | 3/2004 | Bolton et al. |
| 2004/0045682 A1 | 3/2004 | Liprie |
| 2005/0022989 A1 | 2/2005 | Heins |
| 2005/0074712 A1 | 4/2005 | Brookshire et al. |
| 2005/0230238 A1 | 10/2005 | Klausner et al. |
| 2005/0279500 A1 | 12/2005 | Heins |
| 2006/0000355 A1 | 1/2006 | Ogura et al. |
| 2006/0032630 A1 | 2/2006 | Heins |
| 2007/0051513 A1 * | 3/2007 | Heins ........................... 166/265 |
| 2007/0114683 A1 | 5/2007 | Duesel et al. |
| 2007/0251650 A1 | 11/2007 | Duesel et al. |
| 2008/0110417 A1 | 5/2008 | Smith |
| 2008/0173176 A1 | 7/2008 | Duesel et al. |
| 2008/0173590 A1 | 7/2008 | Duesel et al. |
| 2008/0174033 A1 | 7/2008 | Duesel et al. |
| 2008/0213137 A1 | 9/2008 | Frisch et al. |
| 2008/0265446 A1 | 10/2008 | Duesel et al. |
| 2008/0272506 A1 | 11/2008 | Duesel et al. |
| 2009/0078416 A1 * | 3/2009 | Heins ........................... 166/267 |
| 2009/0127091 A1 | 5/2009 | Heins |
| 2009/0294074 A1 | 12/2009 | Forstmanis |
| 2010/0139871 A1 | 6/2010 | Rasmussen et al. |
| 2010/0224364 A1 | 9/2010 | Heins |
| 2011/0061816 A1 | 3/2011 | Duesel, Jr. et al. |
| 2011/0083556 A1 | 4/2011 | Duesel, Jr. et al. |
| 2011/0100924 A1 | 5/2011 | Duesel, Jr. et al. |
| 2011/0147195 A1 | 6/2011 | Shapiro et al. |
| 2011/0168646 A1 | 7/2011 | Tafoya |

FOREIGN PATENT DOCUMENTS

| | | |
|---|---|---|
| DE | 1 173 429 B | 7/1964 |
| FR | 2 441 817 A1 | 6/1980 |
| GB | 383570 A | 11/1932 |
| GB | 463770 A | 4/1937 |
| JP | 60257801 | 12/1985 |
| JP | 2003/021471 A | 1/2003 |
| WO | WO 96-10544 | 4/1996 |
| WO | WO-2004/022487 A2 | 3/2004 |
| WO | WO-2008/112793 A1 | 9/2008 |
| WO | WO-2011/050317 A2 | 4/2011 |

OTHER PUBLICATIONS

Alabovskij et al., "Evaporation Des Eaux De Lavage De Chaudieres Dans Des Appareils A Combustion Immergee," *Promyshl. Energet*, 4:38-39 (1975).

Brandt et al., "Treatment Process for Waste Water Disposal of the "Morcinek" Mine Using Coalbed Methane," Conference on Coalbed Methane Utilization, Oct. 5-7, 1994.

Claflin, "Intraparticle Conduction Effects on the Temperature Profiles in Spouted Beds," Chemeca 85, paper D9b, The Thirteenth Australasian Conference on Chemical Engineering, Perth, Australia, pp. 471-475 (1985).

Cross et al. "Leachate Evaporation by Using Landfill Gas," Proceedings Sardinia 97, Sixth Landfill Symposium, S. Margherita di Pula, Cagliari, Italy, pp. 413-422 (1997).

Dunn, "Incineration's Role in Ultimate Disposal of Process Wastes," *Chemical Engineering, Deskbook Issue*, pp. 141-150 (1975).

Durkee et al., "Field Tests of Salt Recovery System for Spent Pickle Brine," *Journal of Food Service*, 38:507-511 (1973).

English-language translation of Hage, H., "The MeMon Experiment: A Step towards Large-Scale Processing of Manure," Applied Science, 4 (1988).

Etzensperger et al., "Phenol Degradation in a Three-Phase Biofilm Fluidized Sand Bed Reactor," *Bioprocess Engineering*, 4:175-181 (1989).

Fan et al., "Some Remarks on Hydrodynamic Behavior of a Draft Tube Gas-Liquid-Solid Fluidized Bed," AIChE Symposium Series, No. 234(80):91-97 (1985).

Fox et al., "Control Mechanisms of Flulidized Solids Circulation Between Adjacent Vessels," *AIChE Journal*, 35(12):1933-1941 (1989).

Genck, "Guidelines for Crystallizer Selection and Operation," CEP, pp. 26-32 (2004). www.cepmagazine.org.

German Kurz, Tauchbrenner, OI U. Gasfeuerung, 18(3):171-180 (1973).

Hattori et al., "Fluid and Solids Flow Affecting the Solids Circulation Rate in Spouted Beds with a Draft Tube," *Journal of Chemical Engineering of Japan*, 37(9):1085-1091 (2004).

Hocevar et al., "The Influence of Draft-Tube Pressure Pulsations on the Cavitation-Vortex Dynamics in a Francis Turbine," *Journal of Mechanical Engineering*, 49:484-498 (2003).

(56) References Cited

OTHER PUBLICATIONS

International Preliminary Report on Patentability for Application No. PCT/US08/56702, dated Sep. 15, 2009.
International Search Report and Written Opinion for Application No. PCT/US08/56702, dated Jun. 10, 2008.
International Search Report and Written Opinion for Application No. PCT/US10/24143, dated Oct. 12, 2010.
Jones, "Liquid Circulation in a Draft-Tube Bubble Column," *Chemical Engineering Science*, 40(3):449-462 (1985).
Miyake et al., "Performance Characteristics of High Speed-Type Cross Flow Turbine," 83-0047:2575-2583 (1993).
Mueller et al., "Rotating Disk Looks Promising for Plant Wastes," (2007).
Padial et al., "Three-Dimensional Simulation of a Three-Phase Draft-Tube Bubble Column," *Chemical Engineering Science*, 55:3261-3273 (2000).
Sathyanarayana et al., Circular C.W. Intake System—A Research Opinion, Seventh Technical Conference of the British Pump Manufacturer's Association, paper 21, pp. 293-313, 1981.
Schone, "Die Entolung des Abdampfes und der Kondensate von Kolbendampfmaschinen," *Braunkohle*, 31:82-92 (1932).
Shimizu et al., "Filtration Characteristics of Hollow Fiber Microfiltration Membranes Used in Membrane Bioreactor for Domestic Wastewater Treatment," *Wat. Res.*, 30(10):2385-2392 (1996).
Smith, "Sludge-U-Like, As the Ban on Sea Disposal of Sewage Waste Looms, Technologies That Can Deliver Cleaner, Thicker and More Farmer-Friendly Sludges Are Gaining Popularity," *Water Bulletin*, 708 (1996).
St. Onge et al., "Start-Up, Testing, and Performance of the First Bulb-Type Hydroelectric Project in the U.S.A.," *IEEE Transactions on Power Apparatus Systems*, PAS-101(6):1313-1321 (1982).
Swaminathan et al., "Some Aerodynamic Aspects of Spouted Beds of Grains," Department of Chemical Engineering, McGill University, Montreal, Quebec, Canada, pp. 197-204 (2007).
Talbert et al., "The Elecrospouted Bed," *IEEE Transactions on Industry Applications*, vol. 1A-20, No. 5, pp. 1220-1223 (1984).
Williams et al., "Aspects of Submerged Combustion as a Heat Exchange Method," *Trans IChemE*, 71(A):308-309 (1993).
Ye et al., "Removal and Distribution of Iron, Manganese, Cobalt, and Nickel Within a Pennsylvania Constructed Wetland Treating Coal Combustion By-Product Leachate," *J. Environ. Qual.*, 30:1464-1473 (2001).
Yeh et al., "Double-Pass Heat or Mass Transfer Through a Parallel-Plate Channel with Recycle," *International Journal of Hat and Mass Transfer*, 43:487-491 (2000).
Yoshino et al., "Removal and Recovery of Phosphate and Ammonium as Struvite from Supernatant in Anaerobic Digestion," *Water Science and Technology*, 48(1):171-178 (2003).
MikroPul "Wet Scrubbers" brochure, Mar. 2009, www.mikropul.com.
International Search Report and Written Opinion for Application No. PCT/US11/021811, dated Mar. 21, 2011.
"Gas Atomized Venturi Scrubbers," Bionomic Industries, copyright 2008, printed from www.bionomicind.com on May 25, 2011.
"Waste Heat Recovery Systems," Bionomic Industries, copyright 2008, printed from www.bionomicind.com on May 25, 2011.
International Search Report and Written Opinion for Application No. PCT/US10/043647, dated Aril 27, 2011.
International Search Report and Written Opinion for Application No. PCT/US10/043648, dated Apr. 27, 2011.
Chinese Office Action for Application No. 201180014846.5, dated Jun. 18, 2013.
Gaudlip et al; "Marcellus Shale Water Management Challenges in Pennsylvania," SPE Shale Gas Production Conference, Fort Worth (2008).
Search Report for Chinese Patent Application No. 201180014846.5, dated Jun. 8, 2013.

Shaw LFG Specialties, LLC, 2006 Product Catalog.
Alabovskij et al., "Concentration of Boiler Washing Water in Submerged-Combustion Devices," Promyshl. Energet, 4:38-39 (1975). English-language abstract only.
Bachand et al., "Denitrification in Constructed Free-Water Surface Wetlands: II. Effects of Vegetation and Temperature," Ecological Engineering, 14:17-32 (2000).
Barrett et al., "The Industrial Potential and Economic Viability of Spouted Bed Processes," Chemeca 85, paper D4c, The Thirteenth Australasian Conference on Chemical Engineering, Perth, Australia, pp. 401-405 (1985).
Bennett et al., "Design of a Software Application for the Simulation and Control of Continuous and Batch Crystallizer Circuits," Advances in Engineering Software, 33:365-374 (2002).
Berg, "The Development of the Controlled Buoyancy System for Installation of Submerged Pipelines," Journal AWWA, Water Technology/Quality, pp. 214-218 (1977).
Brandt et al., "Treatment Process for Waste Water Disposal of the "Morcinek" Mine Using Coalbed Methane," Conference on Coalbed Methane Utilization, Oct. 5-7 (1994).
Cherednichenko et al., "Disposal of Saline Wastes From Petroleum Refineries, All-Union Scientific-Research and Planning-Design Institute of the Petroleum Refining and Petrochemical Industry," Khimiya I Tekhnologiya Topliv I Masel, 9:37-39 (1974). Translated.
Claflin et al., "The Use of Spouted Beds for the Heat Treatment of Grains," Chemeca 81, The 9th Australasian Conference on Chemical Engineering, Christchurch, New Zealand, 4:65-72 (1981).
EVRAS—Evaporative Reduction and Solidification Systems; Brochure for Web. Believed to be publically available as early as Mar. 5, 2010.
Final Office Action for U.S. Appl. No. 11/625,002, dated May 26, 2010.
Final Office Action for U.S. Appl. No. 11/625,022, dated Jan. 24, 2011.
Final Office Action for U.S. Appl. No. 11/625,024, dated Dec. 8, 2010.
Hill et al., "Produced Water and Process heat Combined Provide Opportunities for Shell CO2"; EVRAS; Facilities 2000: Facilities Engineering in the Next Millennium.
International Preliminary Report on Patentability for Application No. PCT/US2006/015803, dated Nov. 13, 2007.
International Preliminary Report on Patentability for Application No. PCT/US2006/028515, dated Jan. 22, 2008.
International Preliminary Report on Patentability for Application No. PCT/US2010/043648, dated Feb. 9, 2012.
International Preliminary Report on Patentability for Application No. PCT/US2012/021897, dated Aug. 1, 2013.
International Preliminary Report on Patentability for Application No. PCT/US2012/021897, dated Jul. 23, 2013.
International Search Report and Written Opinion for Application No. PCT/US2006/015803, dated Oct. 30, 2007.
Intevras Technologies, LLC—Innovative solutions for water purification, remediation and process improvement; Power Point Presentation, Oct. 2009.
Layne Evaporative Reduction and Solidification System Brochure (2010).
LFG Specialties, LLC, Waste Heat Leachate Evaporator System, Jan. 14, 2011.
Notice of Allowance for U.S. Appl. No. 11/625,159, dated Jul. 9, 2010.
Office Action for U.S. Appl. No. 11/625,002, dated Jan. 6, 2010.
Office Action for U.S. Appl. No. 11/625,022, dated Jun. 22, 2010.
Office Action for U.S. Appl. No. 11/625,024, dated Jun. 18, 2010.
Rule 62 EPC Communication issued from the European Patent Office for Application No. 10805027.9, dated Feb. 5, 2013.
Screen shots from video on LFG website taken Jan. 18, 2011 (http://wvvw.shawgrp.com/markets/envservices/envsolidwaste/swlfg).

\* cited by examiner

COMPACT WASTEWATER CONCENTRATOR AND CONTAMINANT SCRUBBER

RELATED APPLICATIONS

This application is a continuation in part of U.S. patent application Ser. No. 12/846,337, filed Jul. 29, 2010, which is a continuation in part of U.S. patent application Ser. No. 12/705,462, filed on Feb. 12, 2010, which is a continuation in part of U.S. patent application Ser. No. 12/530,484, filed on Sep. 9, 2009, which is a U.S. national phase application of International (PCT) Patent Application No. PCT/US08/56702 filed Mar. 12, 2008 and which claims priority benefit of U.S. Provisional Patent Application No. 60/906,743, filed on Mar. 13, 2007. The entire disclosures of each of application Ser. Nos. 12/846,337, 12/705,462, and 12/530,484; are hereby expressly incorporated by reference herein.

FIELD OF THE DISCLOSURE

This application relates generally to liquid concentrators, and more specifically to compact, portable, cost-effective wastewater concentrators that can be easily connected to and use sources of waste heat and more specifically to compact, portable, cost-effective wastewater concentrators that simultaneously concentrate wastewater while removing contaminants dissolved within the wastewater stream.

BACKGROUND

Concentration can be an effective form of treatment or pretreatment for a broad variety of wastewater streams and may be carried out within various types of commercial processing systems. At high levels of concentration, many wastewater streams may be reduced to residual material in the form of slurries containing high levels of dissolved and suspended solids. Such concentrated residual may be readily solidified by conventional techniques for disposal within landfills or, as applicable, delivered to downstream processes for further treatment prior to final disposal. Concentrating wastewater can greatly reduce freight costs and required storage capacity and may be beneficial in downstream processes where materials are recovered from the wastewater.

Characteristics of industrial wastewater streams are very broad as a result of the large number of industrial processes that produce them. Techniques for managing wastewater include: direct discharge to sewage treatment plants; pretreatment followed by discharge to sewage treatment plants; on-site or off-site processes to reclaim valuable constituents; and on-site or off-site treatment to simply prepare the wastewater for ultimate disposal. Where the wastewater source is an uncontrolled event, effective containment and recovery techniques must be included with any of these options.

An important measure of the effectiveness of a wastewater concentration process is the volume of residual produced in proportion to the volume of wastewater entering the process. In particular, low ratios of residual volume to feed volume (high levels of concentration) are the most desirable. Where the wastewater contains dissolved and/or suspended non-volatile matter, the volume reduction that may be achieved in a particular concentration process that relies on evaporation of volatiles is, to a great extent, limited by the method chosen to transfer heat to the process fluid.

Generally, conventional processes that affect concentration by evaporation of water and other volatile substances use indirect heat transfer systems. Indirect heat transfer systems generally include a vessel that holds a process fluid and a plate, a bayonet tube, or a coil-type heat exchanger immersed within the process fluid. Mediums such as steam or hot oil are passed through the heat exchangers in order to transfer the heat required for evaporation.

Indirect heat transfer systems that rely on heat exchangers such as plates, bayonet tubes, or coils are generally limited by the buildup of deposits of solids on the surfaces of the heat exchangers that come into direct contact with the process fluid. Also, the design of such systems is complicated by the need for a separate process to transfer heat energy to the heating medium such as a steam boiler or devices used to heat other heat transfer fluids such as hot oil heaters. This design leads to dependence on two indirect heat transfer systems to support the concentration process.

Feed streams that produce deposits on heat exchangers while undergoing processing are called fouling fluids. Where feed streams contain certain compounds, such as carbonates, for which solubility decreases with increasing temperature (i.e., inverse solubility), deposits, generally known as boiler scale, will form even at relatively low concentrations due to the elevated temperatures at the surfaces of the heat exchangers. Further, when compounds that have high solubility at elevated temperatures such as sodium chloride are present in the wastewater feed, they will also form deposits by precipitating out of the solution as the process fluid reaches high concentrations (i.e., saturation). Built up layers of solids on heat exchange surfaces act as an insulation barrier that reduces the rate of heat transfer. Additionally, solid deposits may have the potential to corrode certain materials within the heat exchanger. Such deposits, which necessitate frequent cycles of heat exchange surface cleaning to maintain process efficiency and to reduce the potential for corrosion, may be any combination of suspended solids carried into the process with the wastewater feed and solids that precipitate out of the process fluid. To counteract the loss of efficiency and to extend time between cleanings, designers of indirect heat exchange evaporators generally scale up the heat exchange surfaces. In other words, indirect heat exchange surfaces are built larger than needed to reduce cleaning cycles. Additionally, to counteract the potential for corrosion, designers typically select expensive high alloy materials for the heat exchangers. The effect of solid buildup in indirect heat exchangers imposes practical limits on the range of wastewater that might be effectively managed, especially when the range of wastewater includes fouling fluids. Therefore, processes that rely on indirect heat transfer mechanisms are generally unsuitable for concentrating wide varieties of wastewater streams and achieving low ratios of residual to feed volume.

Due to the factors listed above, designers of indirect heat exchange evaporators must balance cost, cleaning cycles, corrosion resistance, and efficiency when designing such systems. In order to extend the time between cleaning cycles, indirect heat exchange evaporators are often limited in differential pressure, which limits the maximum concentration of the process fluid. As a result, known indirect heat exchange evaporators are often limited to less than 20% total solids as a maximum concentration in order to reduce the rate of solid buildup on the heat exchange surfaces.

Another drawback to known indirect heat exchange evaporators is the large amount of heat required to evaporate water in the wastewater. At sea level, generally 1 Btu/Lb/° F. is required to heat the wastewater to its boiling point (this heat is generally called "sensible heat"). Thereafter, approximately 1,000 Btu/Lb is required to effect evaporation of the water (this heat is generally known as "latent heat").

Some indirect heat exchange evaporators have attempted to reduce the amount of thermal energy required to evaporate the water. In particular, a multi-stage indirect evaporative process has been developed that operates under a partial vacuum in an effort to reduce the thermal energy required. Although such designs have been somewhat effective in reducing the amount of thermal energy required, these designs are very expensive and they remain subject to the drawbacks discussed above, in particular, solid deposits and concentration limits.

In addition to evaporation, some traditional wastewater treatment systems include a series of process steps, or "unit operations," that interact to provide a final treated product that is safe. Examples these types of wastewater treatment systems include conventional sewage treatment systems. Conventional sewage treatment systems include process steps, such as, dewatering, heating, microbiological digestion (aerobic and anaerobic), pH adjustment, precipitation, sludge thickening, sludge drying, and denitrification and filtration of treated effluent. Even with the several process steps, which are aimed at cleaning the sewage and producing a safe product, the end product of conventional sewage treatment systems is generally a sludge of some sort. Some of the resultant sludge may contain heavy metals that precipitated out of solution during the treatment process. These heavy metals may be toxic and the heavy metals are difficult to extract from the sludge.

Another drawback to conventional sewage treatment systems is that the process fluid is very sensitive to variations in pH. Moreover, the process fluid may contain compounds that interfere with the microbiological digestion. In other words, the process fluid may contain compounds that are harmful to the bacteria used in the conventional sewage treatment systems.

Yet another conventional method of treating wastewater is a filtration system. Filtration systems may use a diverse range of filtration methods to purify wastewater. Some examples of filtration methods are reverse osmosis, ultrafiltration, and ion exchange. Each of these filtration systems includes a certain degree of sensitivity to contaminants on membranes within the system. Thus, the membranes must be backwashed or cleaned regularly. Moreover, secondary systems may be needed to remove these contaminants, resulting in a more expensive and complex system.

SUMMARY

A compact liquid concentrating device may be easily connected to a source of waste heat, such as a natural gas flare or a combustion engine exhaust stack, and use this waste heat to perform a direct heat transfer concentration and contaminant removal process without the need of large and expensive containment vessels and without a lot of expensive high temperature resistant materials. The compact liquid concentrator includes a gas inlet, a gas exit and a mixing or flow corridor connecting the gas inlet and the gas exit, wherein the flow corridor includes a narrowed portion that accelerates the gas through the flow corridor. A liquid inlet located between the gas inlet and the narrowed portion of the flow corridor, injects liquid into the gas stream at a point prior to the narrowed portion no that the gas-liquid mixture is thoroughly mixed within the flow corridor, causing a portion of the liquid to be evaporated or concentrated. A demister or fluid scrubber downstream of the narrowed portion, and connected to the gas exit, removes entrained liquid droplets from the gas stream and re-circulates the removed liquid to the liquid inlet through a re-circulating circuit. Fresh liquid to be concentrated is also introduced into the re-circulating circuit at a rate sufficient to offset the combined total of liquid evaporated in the flow corridor and any concentrated liquid that is withdrawn from the process.

The compact liquid concentrator described herein includes a number of attributes that operate to cost-effectively concentrate wastewater streams having broad ranges of characteristics. The concentrator is resistant to corrosive effects over a broad range of feed characteristics, has reasonable manufacturing and operating costs, is able to operate continuously at high levels of concentration, and efficiently utilizes heat energy directly from a wide variety of sources. Moreover, the concentrator is compact enough to be portable, and so may be easily transported to locations where wastewater is generated through uncontrolled events and can be installed in close proximity to waste heat sources, such as natural gas well flares. Thus, the concentrator described herein is a cost-effective, reliable and durable device that operates to continuously concentrate abroad range of different types of wastewater streams, and that eliminates the use of conventional solid-surface heat exchangers found in conventional indirect heat transfer systems which lead to clogging and deposit buildups.

The compact liquid concentrator advantageously operates on direct heat exchange without the need for solid heat exchange surfaces. As a result, the compact liquid concentrator is not subject the drawbacks of solid deposits on heat exchange surfaces. Moreover, the compact liquid concentrator is able to operate continuously at very high levels of wastewater concentration. High turbulence in the concentrator forestalls the formation of large crystals and keeps solids suspended in solution. As a result, the compact liquid concentrator experiences very little solid buildup on surfaces. Precipitated solids may be removed from the concentrator through a side process, such as a settling tank or a vacuum belt filter, while the liquid portion is returned to the concentrator. In this way, the concentrator approaches a zero liquid discharge during continuous operation. The precipitated solids may often be deposited in a landfill for disposal.

In one embodiment of the concentrator a reagent may be added to the wastewater pre or post concentration. The reagent may chemically or mechanically react with hazardous components of the wastewater to produce non-hazardous or insoluble products. Thus, the concentrator may be useful in removing harmful substances from wastewater streams.

DETAILED DESCRIPTION

Figure 1:
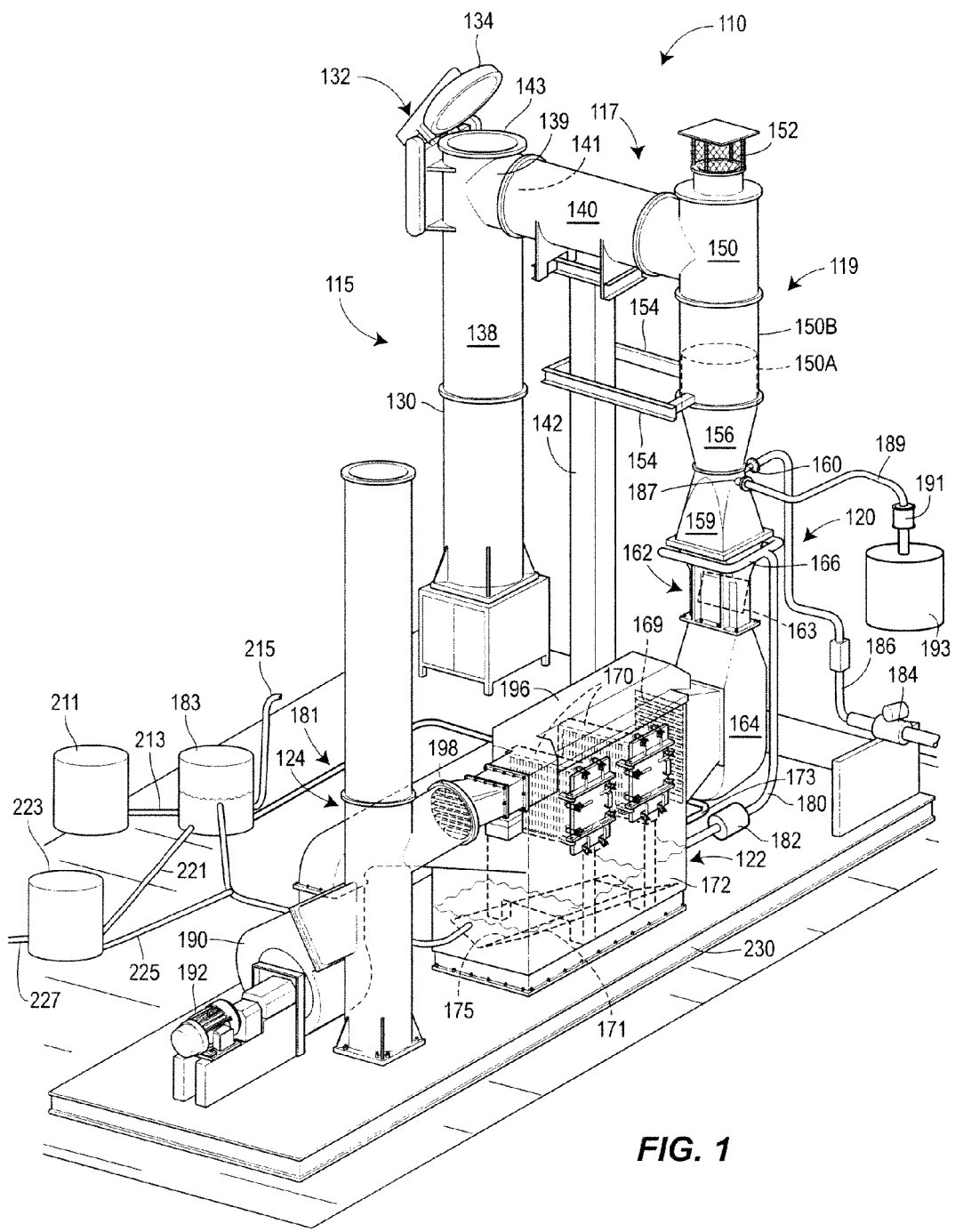
FIG. 1 is a perspective view of a compact liquid concentrator.

FIG. 1 illustrates one particular embodiment of a compact liquid concentrator 110, which is connected to a source of waste heat in the form of a natural gas flare from a natural gas well. Generally speaking, the compact liquid concentrator 110 operates to concentrate wastewater, such as flowback water from a natural gas well, using exhaust or waste heat created within a natural gas flare that burns natural gas in a manner that meets the standards set by the U.S. Environmental Protection Agency (EPA) and/or local regulatory authority. As is known, most natural gas wells include a flare which is used to burn excess natural gas. Typically, the gas exiting the flare is between 1200 and 1500 degrees Fahrenheit and may reach 1800 degrees Fahrenheit. The compact liquid concentrator 100 is equally effective in concentrating landfill leachate or other produced waters and may be operated on exhaust gas from a landfill gas flare, a propane flare, or heat from virtually any other source.

As illustrated in FIG. 1, the compact liquid concentrator 110 generally includes or is connected to a flare assembly 115, and includes a heat transfer assembly 117, an air pre-treatment assembly 119, a concentrator assembly 120 (shown in more detail in FIG. 2), a fluid scrubber 122, and an exhaust section 124. Importantly, the flare assembly 115 includes a flare 130, which burns natural gas (or other combustible fuel) therein according to any known principles, and a flare cap assembly 132. The flare cap assembly 132 may include a moveable cap 134 (e.g., a flare cap, an exhaust gas cap, etc.) which covers the top of the flare 130, or other type of stack (e.g., a combustion gas exhaust stack), to seal off the top of the flare 130 when the flare cap 134 is in the closed position, or to divert a portion of the flare gas in a partially closed position, and which allows gas produced within the flare 130 to escape to the atmosphere through an open end that forms a primary gas outlet 143, when the flare cap 134 is in an open or partially open position. The flare cap assembly 132 also includes a cap actuator, such as a motor 135 (see FIG. 3) which moves the flare cap 134 between the fully open and the fully closed positions. The flare cap actuator may utilize a chain drive or any other type of drive mechanism connected to the flare cap 134 to move the flare cap 134 around a pivot point. The flare cap assembly 132 may also include a counter-weight (see FIG. 3) disposed on the opposite side of the pivot point from the flare cap 134 to balance or offset a portion of the weight of the flare cap 134 when moving the flare cap 134 around the pivot point. The counter-weight enables the actuator to be reduced in size or power while still being capable of moving or rotating the flare cap 134 between an open position, in which the top of the flare 130 (or the primary combustion gas outlet 143) is open to the atmosphere, and a closed position, in which the flare cap 134 covers and essentially seals the top of the flare 130 (or the primary combustion gas outlet 143). The flare cap 134 itself may be made of high temperature resistant material, such as stainless steel or carbon steel, and may be lined or insulated with refractory material including aluminum oxide and/or zirconium oxide on the bottom portion thereof which comes into direct contact with the hot flare gases when the flare cap 134 is in the closed position.

If desired, the flare 130 may include an adapter section 138 including the primary combustion gas outlet 143 and a secondary combustion gas outlet 141 upstream of the primary combustion gas outlet 143. When the flare cap 130 is in the closed position, or in a partially closed position, combustion gas is diverted through the secondary combustion gas outlet 141. The adapter section 138 may include a connector section 139 that connects the flare 130 (or exhaust stack) to the heat transfer section 117 using a 90 degree elbow or turn. Other connector arrangements are possible. For example, the flare 130 and heat transfer section 117 may be connected at virtually any angle between 0 degrees and 180 degrees. In this case, the flare cap assembly 132 is mounted on the top of the adaptor section 138 proximate the primary combustion gas outlet 143.

As illustrated in FIG. 1 the heat transfer assembly 117 includes a transfer pipe 140, which connects to an inlet of the air pre-treatment assembly 119 to the flare 130 and, more particularly, to the adaptor section 138 of the flare 130. A support member 142, in the form of a vertical bar or pole, supports the heat transfer pipe 140 between the flare 130 and the air pre-treatment assembly 119 at a predetermined level or height above the ground. The heat transfer pipe 140 is connected to the connector section 139 or the adapter section 138 at the secondary combustion gas outlet 141, the transfer pipe forming a portion of a fluid passageway between the adapter section 138 and a secondary process, such as a fluid concentrating process. The support member 142 may be necessary because the heat transfer pipe 140 will generally be made of metal, such as carbon or stainless steel, and may be refractory lined with materials such as aluminum oxide and/or zirconium oxide, to withstand the temperature of the gas being transferred from the flare 130 to the air pre-treatment assembly 119. Thus, the heat transfer pipe 140 will typically be a heavy piece of equipment. However, because the flare 130, on the one hand, and the air pre-treatment assembly 119 and the concentrator assembly 120, on the other hand, are disposed immediately adjacent to one another, the heat transfer pipe 140 generally only needs to be of a relatively short length, thereby reducing the cost of the materials used in the concentrator 110, as well as reducing the amount of support structure needed to bear the weight of the heavy parts of the concentrator 110 above the ground. As illustrated in FIG. 1, the heat transfer pipe 140 and the air pre-treatment assembly 119 form an upside-down U-shaped structure.

The air pre-treatment assembly 119 includes a vertical piping section 150 and an ambient air valve 306 (see FIG. 3) disposed at the top of the vertical piping section 150. The ambient air valve 306 (also referred to as a damper or bleed valve) forms a fluid passageway between the heat transfer pipe 140 (or air pre-treatment assembly 119) and the atmosphere. The ambient air valve 306 operates to allow ambient air to flow through a mesh screen 152 (typically wire or metal) and into the interior of the air pre-treatment assembly 119 to mix with the hot gas coming from the flare 130. If desired, the air pre-treatment assembly 119 may include a permanently open section proximate to the ambient air valve 306 which always allows some amount of bleed air into the air pre-treatment assembly 119, which may be desirable to reduce the size of the required ambient air valve 306 and for safety reasons. A pressure blower (not shown) may be connected to the inlet side of the ambient air valve 306, if desired, to force ambient air through the ambient air valve 306. If a pressure blower is implemented, the screen 152 and permanently open section (if implemented) may be relocated to the inlet side of the pressure blower. While the control of the ambient air 306 will be discussed in greater detail hereinafter, the ambient air valve 306 generally allows the gas from the flare 130 to be cooled to a more desirable temperature before entering into the concentrator assembly 120. The air pre-treatment assembly 119 may be supported in part by cross-members 154 connected to the support member 142. The cross-members 154 stabilize the air pre-treatment assembly 119, which is also typically made of heavy carbon or stainless steel or other metal, and which may be refractory-lined to improve energy efficiency and to withstand the high temperature of the gases within this section of the concentrator 110. If desired, the vertical piping section 150 may be extendable to adapt to or account for flares of differing heights so as to make the liquid concentrator 110 easily adaptable to many different flares or to flares of different heights and also to improve efficiency when erecting concentrators by correcting for slight vertical and/or horizontal misalignment of components. The vertical piping section 150 may include a first section 150A (shown using dotted lines) that rides inside of a second section 150B thereby allowing the vertical piping section 150 to be adjustable in length (height).

Generally speaking, the air pre-treatment assembly 119 operates to mix ambient air provided through the ambient air valve 306 beneath the screen 152 and the hot gas flowing from the flare 130 through the heat transfer pipe 140 to create a desired temperature of gas at the inlet of the concentrator assembly 120.

The liquid concentrator assembly 120 includes a lead-in section 156, having a reduced cross-section at the bottom end thereof, which mates the bottom of the piping section 150 to a quencher 159 of the concentrator assembly 120. The concentrator assembly 120 also includes a first fluid inlet 160, which injects new or untreated liquid to be concentrated, such as flowback water from a natural gas well, into the interior of the quencher 159. While not shown in FIG. 1, the inlet 160 may include a coarse sprayer with a large nozzle for spraying the untreated liquid into the quencher 159. Because the liquid being sprayed into the quencher 159 at this point in the system is not yet concentrated, and thus has large amount of water therein, and because the sprayer, is a coarse sprayer, the sprayer nozzle is not subject to fouling or being clogged by the small particles within the liquid. As will be understood, the quencher 159 operates to quickly reduce the temperature of the gas stream (e.g., from about 900 degrees Fahrenheit to less than 200 degrees Fahrenheit) while performing a high degree of evaporation on the liquid injected at the inlet 160. If desired, a temperature sensor 308 (see FIG. 3) may be located at or near the exit of the piping section 150 or in the quencher 159 and may be used to control the position of the ambient air valve to thereby control the temperature of the gas present at the inlet of the concentrator assembly 120.

Figure 2:
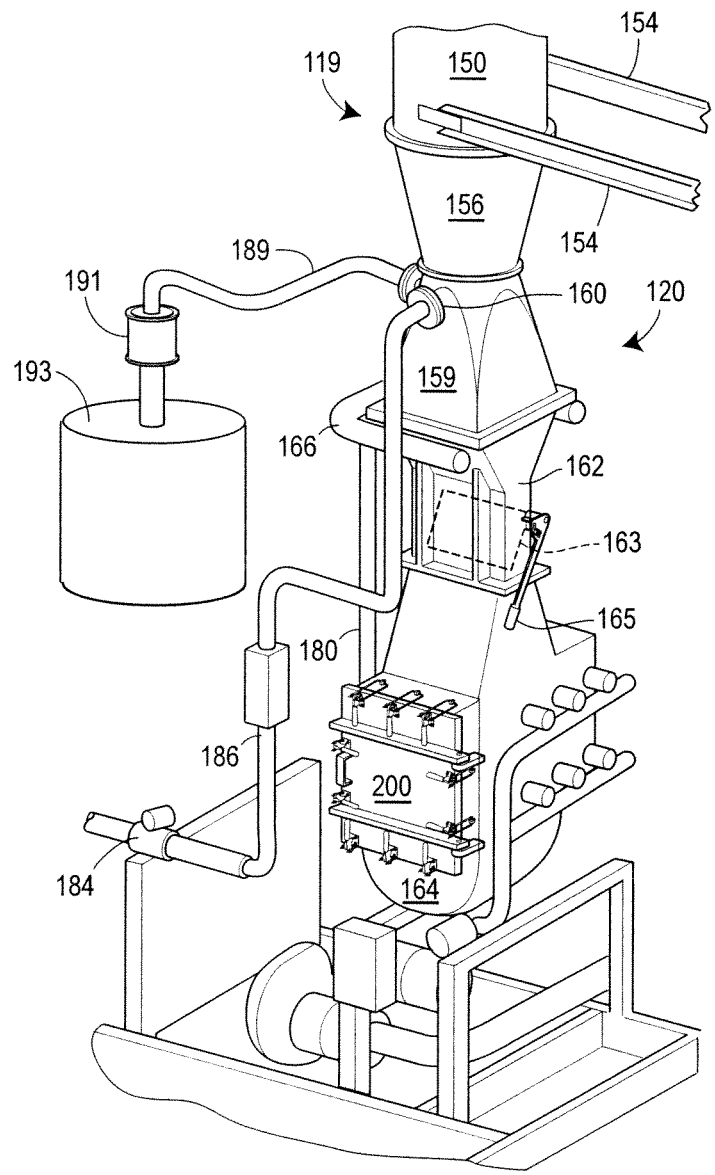
FIG. 2 is a close up perspective view of a concentration/evaporation section of the compact liquid concentrator of FIG. 1.

As shown in FIGS. 1 and 2, the quencher 159 is connected to liquid injection chamber which is connected to a narrowed portion or a venturi section 162 which has a narrowed cross section with respect to the quencher 159 and which has a venturi plate 163 (shown in dotted line) disposed therein. The venturi plate 163 creates a narrow passage through the venturi section 162, which creates a large pressure drop between the entrance and the exit of the venturi section 162. This large pressure drop causes turbulent gas flow and shearing forces within the quencher 159 and the top or entrance of the venturi section 162, and causes a high rate of gas flow out of the venturi section 162, both of which lead to thorough mixing of the gas and liquid in the venturi section 162. The position of the venturi plate 163 may be controlled with a manual control rod 165 (see FIG. 2) connected to the pivot point of the plate 163, or via an automatic positioner that may be driven by an electric motor or pneumatic cylinder.

A re-circulating pipe 166 extends around opposite sides of the entrance of the venturi section 162 and operates to inject partially concentrated (i.e., re-circulated) liquid into the venturi section 162 to be further concentrated and/or to prevent the formation of dry particulate within the concentrator assembly 120 through multiple fluid entrances located on one or more sides of the flow corridor. While not explicitly shown in FIGS. 1 and 2, a number of pipes, such as three pipes of, for example, ½ inch diameter, may extend from each of the opposites legs of the pipe 166 partially surrounding the venturi section 162, and through the walls and into the interior of the venturi section 162. Because the liquid being ejected into the concentrator 110 at this point is re-circulated liquid, and is thus either partially concentrated or being maintained at a particular equilibrium concentration and more prone to plug a spray nozzle than the less concentrated liquid injected at the inlet 160, this liquid may be directly injected without a sprayer so as to prevent clogging. However, if desired, a baffle in the form of a flat plate may be disposed in front of each of the openings of the diameter pipes to cause the liquid being injected at this point in the system to hit the baffle and disperse into the concentrator assembly 120 as smaller droplets. In any event, the configuration of this re-circulating system distributes or disperses the re-circulating liquid better within the gas stream flowing through the concentrator assembly 120.

The combined hot gas and liquid flows in a turbulent manner through the venturi section 162. As noted above, the venturi section 162, which has a moveable venturi plate 163 disposed across the width of the concentrator assembly 120, causes turbulent flow and complete mixture of the liquid and gas, causing rapid evaporation of the discontinuous liquid phase into the continuous gas phase. Because the mixing action caused by the venturi section 162 provides a high degree of evaporation, the gas cools substantially in the concentrator assembly 120, and exits the venturi section 162 into a flooded elbow 164 at high rates of speed. In fact, the temperature of the gas-liquid mixture at this point may be about 160 degrees Fahrenheit. In one embodiment, the total length of the concentrator assembly may be 20 feet or less, particularly between about 4 feet to about 12 feet, and more particularly between about 5 feet and about 10 feet. In one embodiment, the maximum cross sectional area of the venturi section 162 may be about 25 square feet or less, particularly between about 2 square feet and about 16 square feet, and more particularly between about 3 square feet and about 8 square feet. The above described dimensions produce an efficient and sufficient amount of turbulence in the gas/liquid flow that enhances heat and mass transfer between the gas and the liquid particles because these dimensions result in the formation of a significant amount of interfacial area between the gas and liquid phases. In one embodiment, in which 8.75 gallons per minute of wastewater that contained approximately 26% total solids by weight was introduced into the concentrator 110, while 85 gallons per minute of concentrated wastewater was continually recirculated from the sump 172 (for a total of approximately 93.75 gallons per minute of fluid total), along with approximately 14,000 cubic feet per minute of combustion gas, created approximately 5.26 acres/minute of total interfacial area between the gas and liquid phases (assuming an average liquid particle size of approximately 110 microns in diameter). This amount of interfacial area far exceeds the interfacial area achievable in known indirect heat exchanger evaporation systems.

A weir arrangement (not shown) within the bottom of the flooded elbow 164 maintains aconstant level of partially or fully concentrated re-circulated liquid disposed therein. Droplets of re-circulated liquid that are entrained in the gas phase as the gas-liquid mixture exits the ventufi section 162 at high rates of speed are thrown outward onto the surface of the re-circulated liquid held within the bottom of the flooded elbow 164 by centrifugal force generated when the gas-liquid mixture is forced to turn 90 degrees to flow into the fluid scrubber 122. Significant numbers of liquid droplets entrained within the gas phase that impinge on the surface of the re-circulated liquid held in the bottom of the flooded elbow 164 coalesce and join with the re-circulated liquid thereby increasing the volume of re-circulated liquid in the bottom of the flooded elbow 164 causing an equal amount of the re-circulated liquid to overflow the weir arrangement and flow by gravity into the sump 172 at the bottom of the fluid scrubber 122. Thus, interaction of the gas-liquid stream with the liquid within the flooded elbow 164 removes liquid droplets from the gas-liquid stream, and also prevents suspended particles within the gas-liquid stream from hitting the bottom of the flooded elbow 164 at high velocities, thereby preventing erosion of the metal that forms the portions of side walls located beneath the level of the weir arrangement and the bottom of the flooded elbow 164.

After leaving the flooded elbow 164, the gas-liquid stream in which evaporated liquid and some liquid and other particles still exist, flows through the fluid scrubber 122 which is, in this case, across-flow fluid scrubber. The fluid scrubber 122 includes various screens or filters which serve to remove entrained liquids and other particles from the gas-liquid stream. In one particular example, the cross flow scrubber 122 may include an initial coarse impingement baffle 169 at the input thereof, which is designed to remove liquid droplets in the range of 50 to 100 microns in size or higher. Thereafter, two removable filters in the form of chevrons 170 are disposed across the fluid path through the fluid scrubber 122, and the chevrons 170 may be progressively sized or configured to remove liquid droplets of smaller and smaller sizes, such as 20-30 microns and less than 10 microns. Of course, more or fewer filters or chevrons could be used.

As is typical in cross flow scrubbers, liquid captured by the filters 169 and 170 and the overflow weir arrangement within the bottom of the flooded elbow 164 drain by gravity into the reservoir or sump 172 located at the bottom of the fluid scrubber 122. The sump 172, which may hold, for example, approximately 200 gallons of liquid, thereby collects concentrated fluid containing dissolved and suspended solids removed from the gas-liquid stream and operates as a reservoir for a source of re-circulating concentrated liquid back to the concentrator assembly 120 to be further treated and/or to prevent the formation of dry particulate within the concentrator assembly 120. In one embodiment, the sump 172 may include a sloped V-shaped bottom 171 having a V-shaped groove 175 extending from the back of the fluid scrubber 122 (furthest away from the flooded elbow 164) to the front of the fluid scrubber 122 (closest to the flooded elbow 164), wherein the V-shaped groove 175 is sloped such that the bottom of the V-shaped groove 175 is lower at the end of the fluid scrubber 122 nearest the flooded elbow 164 than at an end farther away from the flooded elbow 164. In other words, the V-shaped bottom 171 may be sloped with the lowest point of the V-shaped bottom 171 proximate the exit port 173 and/or the pump 182. Additionally, a washing circuit 177 (see FIG. 3) may pump concentrated fluid from the sump 172 to a sprayer 179 within the cross flow scrubber 122, the sprayer 179 being aimed to spray liquid at the V-shaped bottom 171. Alternatively, the sprayer 179 may spray un-concentrated liquid or clean water at the V-shaped bottom 171. The sprayer 179 may periodically or constantly spray liquid onto the surface of the V-shaped bottom 171 to wash solids and prevent solid buildup on the V-shaped bottom 171 or at the exit port 173 and/or the pump 182. As a result of this V-shaped sloped bottom 171 and washing circuit 177, liquid collecting in the sump 172 is continuously agitated and renewed, thereby maintaining a relatively constant consistency and maintaining solids in suspension. If desired, the spraying circuit 177 may be a separate circuit using a separate pump with, for example, an inlet inside of the sump 172, or may use a pump 182 associated with a concentrated liquid re-circulating circuit described below to spray concentrated fluid from the sump 172 onto the V-shaped bottom 171.

As illustrated in FIG. 1, a return line 180, as well as the pump 182, operates to re-circulate fluid removed from the gas-liquid stream from the sump 172 back to the concentrator 120 and thereby complete a fluid or liquid re-circulating circuit. Likewise, a pump 184 may be provided within an input line 186 to pump new or untreated liquid, such as flowback water from a natural gas well, to the input 160 of the concentrator assembly 120. Also, one or more sprayers (not shown) may be disposed inside the fluid scrubber 122 adjacent the chevrons 170 and may be operated periodically to spray clean water or a portion of the wastewater feed on the chevrons 170 to keep them clean.

Concentrated liquid also may be removed from the bottom of the fluid scrubber 122 via the exit port 173 and may be further processed or disposed of in any suitable manner in a side-arm process or secondary re-circulating circuit 181. In particular, the concentrated liquid removed by the exit port 173 contains a certain amount of suspended solids, which preferably may be separated from the liquid portion of the concentrated liquid and removed from the system using the secondary re-circulating circuit 181. In one example, the concentrated fluid may include from between about 50% to about 60% total solids. Concentrated liquid removed from the exit port 173 may be transported through the secondary re-circulating circuit 181 to one or more solid/liquid separating devices 183, such as gravity settling tanks, vibrating screens, rotary vacuum filters, horizontal belt vacuum filters, belt presses, filter presses, and/or hydro-cyclones. The solid/liquid separating device 183 may provide a zone of low turbulence that favors crystallization of precipitates, which may cause particles of suspended solids to enlarge, settle more rapidly and separate more readily. After the suspended solids and liquid portion of the concentrated wastewater are separated by the solid/liquid separating device 183, the liquid portion of the concentrated wastewater with suspended particles substantially removed may be returned to the sump 172 for further processing in the first or primary re-circulating circuit connected to the concentrator. The solid portion of the concentrated wastewater, which in one embodiment may include approximately 80% total solids or more, may be removed from the system through extraction port 215 and disposed of by depositing the solid portion in a landfill, for example. Alternatively, the solid portion of the concentrated wastewater may undergo further processing to recover salable materials, such as road salt, or ingredients for drilling mud.

The gas, which flows through and out of the fluid scrubber 122 with the liquid and suspended solids removed therefrom, exits out of piping or ductwork at the back of the fluid scrubber 122 (downstream of the chevrons 170) and flows through an induced draft fan 190 of the exhaust assembly 124, from where it is exhausted to the atmosphere in the form of the cooled hot inlet gas mixed with the evaporated water vapor. Of course, an induced draft fan motor 192 is connected to and operates the fan 190 to create negative pressure within the fluid scrubber 122 so as to ultimately draw gas from the flare 130 through the transfer pipe 140, the air pre-treatment assembly 119 and the concentrator assembly 120. The induced draft fan 190 needs only to provide a slight negative pressure within the fluid scrubber 122 to assure proper operation of the concentrator 110.

While the speed of the induced draft fan 190 can be varied by a device such as a variable frequency drive operated to create varying levels of negative pressure within the fluid scrubber 122 and thus can usually be operated within a range of gas flow capacity to assure complete gas flow from the flare 130, if the gas being produced by the flare 130 is not of sufficient quantity, the operation of the induced draft fan 190 cannot necessarily be adjusted to assure a proper pressure drop across the fluid scrubber 122 itself. That is, to operate efficiently and properly, the gas flowing through the fluid scrubber 122 must be at a sufficient (minimal) flow rate at the input of the fluid scrubber 122. Typically this requirement is controlled by keeping at least a preset minimal pressure drop across the fluid scrubber 122. However, if the flare 130 is not producing at least a minimal level of gas, increasing the speed of the induced draft fan 190 will not be able to create the required pressure drop across the fluid scrubber 122.

To compensate for this situation, the cross flow scrubber 122 is designed to include a gas re-circulating circuit which can be used to assure that enough gas is present at the input of the fluid scrubber 122 to enable the system to acquire the needed pressure drop across the fluid scrubber 122. In particular, the gas re-circulating circuit includes a gas return line or return duct 196 which connects the high pressure side of the exhaust assembly 124 (e.g., downstream of the induced draft fan 190) to the input of the fluid scrubber 122 (e.g., a gas input of the fluid scrubber 122) and a baffle or control mechanism 198 disposed in the return duct 196 which operates to open and close the return duct 196 to thereby fluidly connect the high pressure side of the exhaust assembly 124 to the input of the fluid scrubber 122. During operation, when the gas entering into the fluid scrubber 122 is not of sufficient quantity to obtain the minimal required pressure drop across the fluid scrubber 122, the baffle 198 (which may be, for example, a gas valve, a damper such as a louvered damper, etc.) is opened to direct gas from the high pressure side of the exhaust assembly 124 (i.e., gas that has traveled through the induced draft fan 190) back to the input of the fluid scrubber 122. This operation thereby provides a sufficient quantity of gas at the input of the fluid scrubber 122 to enable the operation of the induced draft fan 190 to acquire the minimal required pressure drop across the fluid scrubber 122.

Referring back to FIG. 2, it will be seen that the front the flooded elbow 164 of the concentrator assembly 120 also includes a quick opening access door 200, which allows easy access to the inside of the flooded elbow 164. However, similar quick opening access doors could be located on any desired part of the fluid concentrator 110, as most of the elements of the concentrator 10 operate under negative pressure.

The combination of features illustrated in FIGS. 1 and 2 makes for a compact fluid concentrator 110 that uses waste heat in the form of gas resulting from the operation of a natural gas flare, which waste heat would otherwise be vented directly to the atmosphere. Importantly, the concentrator 110 uses only a minimal amount of expensive high temperature resistant material to provide the piping and structural equipment required to use the high temperature gases exiting from the flare 130. For example, the small length of the transfer pipe 140, which is made of the most expensive materials, is minimized, thereby reducing the cost and weight of the fluid concentrator 110. Moreover, because of the small size of the heat transfer pipe 140, only a single support member 142 is needed thereby further reducing the costs of building the concentrator 110. Still further, the fact that the air pre-treatment assembly 119 is disposed directly on top of the fluid concentrator assembly 120, with the gas in these sections flowing downward towards the ground, enables these sections of the concentrator 110 to be supported directly by the ground or by a skid on which these members are mounted. This configuration keeps the concentrator 110 disposed very close to the flare 130, making it more compact. Likewise, this configuration keeps the high temperature sections of the concentrator 110 (e.g., the top of the flare 130, the heat transfer pipe 140 and the air pre-treatment assembly 119) above the ground and away from accidental human contact, leading to a safer configuration. In fact, due to the rapid cooling that takes place in the venturi section 162 of the concentrator assembly 120, the venturi section 162, the flooded elbow 164 and the fluid scrubber 122 are typically cool enough to touch without harm (even when the gases exiting the flare 130 are at 1800 degrees Fahrenheit). Rapid cooling of the gas-liquid mixture allows the use of generally lower cost materials that are easier to fabricate and that are corrosion resistant. Moreover, parts downstream of the flooded elbow 164, such as the fluid scrubber 122, induced draft fan 190, and exhaust section 124 may be fabricated from materials such as fiberglass.

The fluid concentrator 110 is also a very fast-acting concentrator. Because the concentrator 110 is a direct contact type of concentrator, it is not subject to deposit buildup, clogging and fouling to the same extent as most other concentrators. Still further, the ability to control the flare cap 134 to open and close, depending on whether the concentrator 110 is being used or operated, allows the flare 130 to be used to burn gas without interruption when starting and stopping the concentrator 110. More particularly, the flare cap 134 can be quickly opened at any time to allow the flare 130 to simply burn gas as normal while the concentrator 110 is shut down. On the other hand, the flare cap 134 can be quickly closed when the concentrator 110 is started up, thereby diverting hot gasses created in the flare 130 to the concentrator 110, and allowing the concentrator 110 to operate without interrupting the operation of the flare 130. In either case, the concentrator 110 can be started and stopped based on the operation of the flare cap 134 without interrupting the operation of the flare 130.

If desired, the flare cap 134 may be opened to a partial amount during operation of the concentrator 110 to control the amount of gas that is transferred from the flare 130 to the concentrator 110. This operation, in conjunction with the operation of the ambient air valve, may be useful in controlling the temperature of the gas at the entrance of the venturi section 162.

Moreover, due to the compact configuration of the air pre-treatment assembly 119, the concentrator assembly 120 and the fluid scrubber 122, parts of the concentrator assembly 120, the fluid scrubber 122, the draft fan 190 and at least a lower portion of the exhaust section 124 can be permanently mounted on (connected to and supported by) a skid or plate. The upper parts of the concentrator assembly 120, the air pre-treatment assembly 119 and the heat transfer pipe 140, as well as a top portion of the exhaust stack, may be removed and stored on the skid or plate for transport, or may be transported in a separate truck. Because of the manner in which the lower portions of the concentrator 110 can be mounted to a skid or plate, the concentrator 110 is easy to move and install. In particular, during set up of the concentrator 110, the skid, with the fluid scrubber 122, the flooded elbow 164 and the draft fan 190 mounted thereon, may be offloaded at the site at which the concentrator 110 is to be used by simply offloading the skid onto the ground or other containment area at which the concentrator 110 is to be assembled. Thereafter, the venturi section 162, the quencher 159, and the air pre-treatment assembly 119 may be placed on top of and attached to the flooded elbow 164. The piping section 150 may then be extended in height to match the height of the flare 130 to which the concentrator 110 is to be connected. In some cases, this may first require mounting the flare cap assembly 132 onto a pre-existing flare 130. Thereafter, the heat transfer pipe 140 may be raised to the proper height and attached between the flare 130 and the air pre-treatment assembly 119, while the support member 142 is disposed in place. For concentrators in the range of 10,000 to 30,000 gallons per day evaporative capacity, it is possible that the entire flare assembly 115 may be mounted on the same skid or plate as the concentrator 120.

Because most of the pumps, fluid lines, sensors and electronic equipment are disposed on or are connected to the fluid concentrator assembly 120, the fluid scrubber 122 or the draft fan assembly 190, setup of the concentrator 110 at a particular site requires only minimal plumbing, mechanical, and electrical work at the site. As a result, the concentrator 110 is relatively easy to install and to set up at (and to disassemble and remove from) a particular site. Moreover, because a majority of the components of the concentrator 110 are permanently mounted to the skid, the concentrator 110 can be easily transported on a truck or other delivery vehicle and can be easily dropped off and installed at particular location, such as next to a landfill flare.

Figure 3:
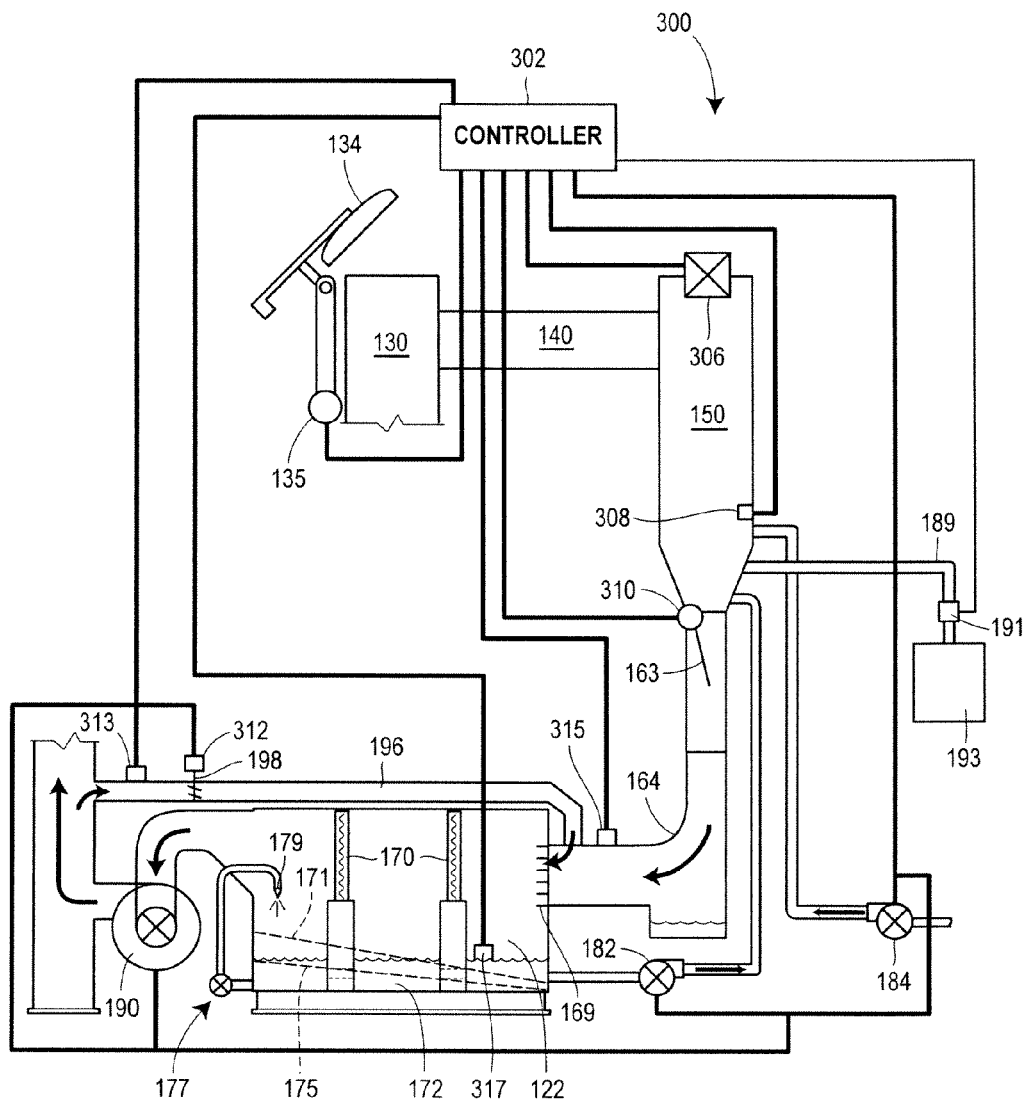
FIG. 3 is a schematic view of the compact liquid concentrator of FIG. 1.

FIG. 3 illustrates a schematic diagram of a control system 300 that may be used to operate the concentrator 110 of FIG. 1. As illustrated in FIG. 3, the control system 300 includes a controller 302, which may be a form of digital signal processor type of controller, a programmable logic controller (PLC) which may run, for example, ladder logic based control, or any other type of controller. The controller 302 is, of course, connected to various components within the concentrator 110. In particular, the controller 302 is connected to the flare cap drive motor 135, which controls the opening and closing operation of the flare cap 134. The motor 135 may be set up to control the flare cap 134 to move between a fully open and a fully closed position. However, if desired, the controller 302 may control the drive motor 135 to open the flare cap 134 to any of a set of various different controllable positions between the fully opened and the fully closed position. The motor 135 may be continuously variable if desired, so that the flare cap 134 may be positioned at any desired point between fully open and fully closed.

Additionally, the controller 302 is connected to and controls the ambient air inlet valve 306 disposed in the air pretreatment assembly 119 of FIG. 1 upstream of the venturi section 162 and may be used to control the pumps 182 and 184 which control the amount of and the ratio of the injection of new liquid to be treated and the re-circulating liquid being treated within the concentrator 110. The controller 302 may be operatively connected to a sump level sensor 317 (e.g., a float sensor, anon-Contact sensor such as a radar or sonic unit, or a differential pressure cell). The controller 302 may use a signal from the sump level sensor 317 to control the pumps 182 and 184 to maintain the level of concentrated fluid within the sump 172 at a predetermined or desired level. Also, the controller 302 may be connected to the induced draft fan 190 to control the operation of the fan 190, which may be a single speed fan, a variable speed fan or a continuously controllable speed fan. In one embodiment, the induced draft fan 190 is driven by a variable frequency motor, so that the frequency of the motor is changed to control the speed of the fan. Moreover, the controller 302 is connected to a temperature sensor 308 disposed at, for example, the inlet of the concentrator assembly 120 or at the inlet of the venturi section 162, and receives a temperature signal generated by the temperature sensor 308. The temperature sensor 308 may alternatively be located downstream of the venturi section 162 or the temperature sensor 308 may include a pressure sensor for generating a pressure signal.

During operation and at, for example, the initiation of the concentrator 110, when the flare 130 is actually running and is thus burning natural gas, the controller 302 may first turn on the induced draft fan 190 to create a negative pressure within the fluid scrubber 122 and the concentrator assembly 120. The controller 302 may then or at the same time, send a signal to the motor 135 to close the flare cap 134 either partially or completely, to direct waste heat from the flare 130 into the transfer pipe 140 and thus to the air pre-treatment assembly 119. Based on the temperature signal from the temperature sensor 308, the controller 302 may control the ambient air valve 306 (typically by closing this valve partially or completely) and/or the flare cap actuator to control the temperature of the gas at the inlet of the concentrator assembly 120. Generally speaking, the ambient air valve 306 may be biased in a fully open position (i.e., may be normally open) by a biasing element such as a spring, and the controller 302 may begin to close the valve 306 to control the amount of ambient air that is diverted into the air pre-treatment assembly 119 (due to the negative pressure in the air pre-treatment assembly 119), so as to cause the mixture of the ambient air and the hot gases from the flare 130 to reach a desired temperature. Additionally, if desired, the controller 302 may control the position of the flare cap 134 (anywhere from fully open to fully closed) and may control the speed of the induced draft fan 190, to control the amount of gas that enters the air pre-treatment assembly 119 from the flare 130. As will be understood, the amount of gas flowing through the concentrator 110 may need to vary depending on ambient air temperature and humidity, the temperature of the flare gas, the amount of gas exiting the flare 130, etc. The controller 302 may therefore control the temperature and the amount of gas flowing through the concentrator assembly 120 by controlling one or any combination of the ambient air control valve 306, the position of the flare cap 134 and the speed of the induced draft fan 190 based on, for example, the measurement of the temperature sensor 308 at the inlet of the concentrator assembly 120. This feedback system is desirable because, in many cases, the air coming out of a flare 130 is between 1200 and 1800 degrees Fahrenheit, which may be too hot, or hotter than required for the concentrator 110 to operate efficiently and effectively.

In any event, as illustrated in FIG. 3, the controller 302 may also be connected to a motor 310 which drives or controls the position of the venturi plate 163 within the narrowed portion of the concentrator assembly 120 to control the amount of turbulence caused within the concentrator assembly 120. Still further, the controller 302 may control the operation of the pumps 182 and 184 to control the rate at which (and the ratio at which) the pumps 182 and 184 provide re-circulating liquid and new waste fluid to be treated to the inputs of the quencher 159 and the venturi section 162. In one embodiment, the controller 302 may control the ratio of the re-circulating fluid to new fluid to be about 10:1, so that if the pump 184 is providing 8 gallons per minute of new liquid to the input 160, the re-circulating pump 182 is pumping 80 gallons per minute. Additionally, or alternatively, the controller 302 may control the flow of new liquid to be processed into the concentrator (via the pump 184) by maintaining a constant or predetermined level of concentrated liquid in the sump 172 using, for example, the level sensor 317. Of course, the amount of liquid in the sump 172 will be dependent on the rate of concentration in the concentrator, the rate at which concentrated liquid is pumped from or otherwise exists the sump 172 via the secondary re-circulating circuit and the rate at which liquid from the secondary re-circulating circuit is provided back to the sump 172, as well as the rate at which the pump 182 pumps liquid from the sump 172 for delivery to the concentrator via the primary re-circulating circuit.

If desired, one or both of the ambient air valve 306 and the flare cap 134 may be operated in a fail-safe open position, such that the flare cap 134 and the ambient air valve 306 open in the case of a failure of the system (e.g., a loss of control signal) or a shutdown of the concentrator 110. In one case, the flare cap motor 135 may be spring loaded or biased with a biasing element, such as a spring, to open the flare cap 134 or to allow the flare cap 134 to open upon loss of power to the motor 135. Alternatively, the biasing element may be the counter-weight 137 on the flare cap 134 may be so positioned that the flare cap 134 itself swings to the open position under the applied force of the counter-weight 137 when the motor 135 loses power or loses a control signal. This operation causes the flare cap 134 to open quickly, either when power is lost or when the controller 302 opens the flare cap 134, to thereby allow hot gas within the flare 130 to exit out of the top of the flare 130. Of course, other manners of causing the flare cap 134 to open upon loss of control signal can be used, including the use of a torsion spring on the pivot point 136 of the flare cap 134, a hydraulic or pressurized air system that pressurizes a cylinder to close the flare cap 134, loss of which pressure causes the flare cap 134 to open upon loss of the control signal, etc.

Thus, as will be noted from the above discussion, the combination of the flare cap 134 and the ambient air valve 306 work in unison to protect the engineered material incorporated into the concentrator 110, as whenever the system is shut down, the flare cap and the air valve 306 automatically immediately open, thereby isolating hot gas generated in the flare 130 from the process while quickly admitting ambient air to cool the process.

Moreover, in the same manner, the ambient air valve 306 may be spring biased or otherwise configured to open upon shut down of the concentrator 110 or loss of signal to the valve 306. This operation causes quick cooling of the air pre-treatment assembly 119 and the concentrator assembly 120 when the flare cap 134 opens. Moreover, because of the quick opening nature of the ambient air valve 306 and the flare cap 134, the controller 302 can quickly shut down the concentrator 110 without having to turn off or effect the operation of the flare 130.

Furthermore, as illustrated in the FIG. 3, the controller 302 may be connected to the venturi plate motor 310 or other actuator which moves or actuates the angle at which the venturi plate 163 is disposed within the venturi section 162. Using the motor 310, the controller 302 may change the angle of the venturi plate 163 to alter the gas flow through the concentrator assembly 120, thereby changing the nature of the turbulent flow of the gas through concentrator assembly 120, which may provide for better mixing of the liquid and gas therein and obtain better or more complete evaporation of the liquid. In this case, the controller 302 may operate the speed of the pumps 182 and 184 in conjunction with the operation of the venturi plate 163 to provide for optimal concentration of the wastewater being treated. Thus, as will be understood, the controller 302 may coordinate the position of the venturi plate 163 with the operation of the flare cap 134, the position of the ambient air or bleed valve 306, and the speed of the induction fan 190 to maximize wastewater concentration (turbulent mixing) without fully drying the wastewater so as to prevent formation of dry particulates. The controller 302 may use pressure inputs from the pressure sensors to position the venturi plate 163. Of course, the venturi plate 163 may be manually controlled or automatically controlled.

The controller 302 may also be connected to a motor 312 which controls the operation of the damper 198 in the gas re-circulating circuit of the fluid scrubber 122. The controller 302 may cause the motor 312 or other type of actuator to move the damper 198 from a closed position to an open or to a partially open position based on, for example, signals from pressure sensors 313, 315 disposed at the gas exit and the gas entrance of the fluid scrubber 122, respectively. The controller 302 may control the damper 198 to force gas from the high pressure side of the exhaust section 124 (downstream of the induced draft fan 190) into the fluid scrubber entrance to maintain a predetermined minimum pressure difference between the two pressure sensors 313, 315. Maintaining this minimum pressure difference assures proper operation of the fluid scrubber 122. Of course, the damper 198 may be manually controlled instead or in addition to being electrically controlled.

As will be understood, the concentrator 110 described herein directly utilizes hot waste gases in processes after the gases have been thoroughly treated to meet emission standards, and so seamlessly separates the operational requirements of the process that generates the waste heat from the process which utilizes the waste heat in a simple, reliable and effective manner.

While the liquid concentrator 110 has been described above as being connected to a natural gas flare to use the waste heat generated in the natural gas flare, the liquid concentrator 110 can be easily connected to other sources of waste heat. For example, another embodiment of the concentrator 110 may be connected to an exhaust stack of a combustion engine plant and to use the waste heat from the engine exhaust to perform liquid concentration. While, in yet another embodiment, the engine within the plant may operate on landfill gas to produce electricity, the concentrator 110 can be connected to run with exhaust from other types of engines, including other types of combustion engines, such as those that operate on gasoline, diesel fuel, propane, natural gas, etc.

Removal of Contaminants from Wastewater and/or Combustion Gas

Embodiments of the concentrators and processes described above can be readily modified to accommodate the removal of contaminants from the wastewater being concentrated and also from the combustion gas employed to concentrate that wastewater. Such modifications are contemplated to be particularly advantageous where the contaminants sought to be removed are among those whose emissions are typically regulated by governmental authorities. Examples of such contaminants include barium and other harmful materials (e.g., calcium, iron, magnesium potassium, sodium, strontium, sulfate, etc.) dissolved in flowback water from natural gas wells. Additionally, fouling substances, such as scaling metals, may be removed from flowback water. Described below are modifications that may be made to the embodiments of the concentrators and processes described above to accommodate removal of barium or other harmful materials or scaling metals, but the description is not intended to be limiting to the removal of only such contaminants.

For example, two methods of removal of contaminants from wastewater include pre-concentration treatment and post-concentration treatment. More particularly, contaminants may be scrubbed by injecting a reagent or stabilizing compound into the wastewater that reacts chemically or mechanically with the contaminant prior to wastewater concentration, or contaminants may be scrubbed by mixing a stabilizing compound into the concentrated wastewater after concentration.

In the pre-concentration treatment method, contaminants may be either sequestered or stabilized. In pre-concentration sequestration, a reagent (e.g., sodium sulfate) is mixed with the wastewater prior to concentration and the reagent chemically reacts with the contaminant to form an insoluble chemical compound (e.g., barium sulfate) that precipitates out of solution. The insoluble chemical compound may settle out of the concentrated wastewater, for example, in the settling tank 183 (FIG. 1). Once the insoluble chemical compound settles out of the concentrated wastewater in the settling tank, the insoluble chemical compound may be drawn off, along with other solids, for example, through the extraction port 215.

In pre-concentration stabilization, a stabilizing compound is mixed with the wastewater prior to concentration and the stabilizing compound reacts chemically or mechanically with the contaminant to render the contaminant non-hazardous or insoluble. For example, the stabilizing compound may encase the contaminant in a crystalline matrix that is insoluble. Thus, the contaminant is also rendered insoluble. Once stabilized, the contaminant and stabilizing compound may be extracted, for example, from the settling tank 183, similar to pre-concentration sequestration.

Post-concentration stabilization includes mixing a stabilizing compound with the concentrated wastewater in the settling tank 183. The stabilizing compound reacts chemically or mechanically to render the contaminant non-hazardous or insoluble, similar to the pre-concentration stabilization. The stabilized contaminant may be removed, for example, from the settling tank 183 and through the extraction port 215.

Both the pre-concentration and post-concentration removal methods described above may be used to remove high levels of dissolved barium (e.g., barium chloride) from flowback water. Barium is a known hazardous material that is occasionally found dissolved in flowback water from natural gas wells. Flowback water from natural gas wells in the Marcellus Shale Bed (located in the vicinity of the northern Appalachian Mountains) contains high levels of dissolved barium. Additionally, this flowback water contains extremely high levels of total dissolved solids, in the range of 250,000 parts per million (ppm) or 25% by weight, or higher. Such high levels of dissolved solids are extremely difficult to concentrate via conventional methods. However, these high levels of dissolved solids are treatable with the concentrator disclosed herein. Soluble barium compounds, such as those found in some flowback water, are highly poisonous if ingested. As a result, disposal of barium compounds is often regulated by state or federal authorities.

As described above, two examples of methods of barium removal from flowback water using the disclosed concentrator are pre-concentration treatment and post-concentration treatment. In pre-treatment sequestering certain chemical reagents are added to the flowback water before the flowback water is injected into the concentrator causing chemical reactions with the barium ions to form insoluble barium compounds. In pre or post-concentration stabilization barium compounds are mechanically or chemically prevented from reacting chemically with other compounds to produce unwanted barium compounds, such as barium compounds that are soluble.

Pre-Concentration Barium Sequestration

As discussed above, flowback water from natural gas wells can contain high levels of dissolved barium compounds. One such dissolved barium compound is barium chloride. A method of removing the barium from the flowback water involves chemically reacting the barium chloride with another substance to produce a relatively insoluble barium compound. One way to accomplish this reaction is to introduce a reagent comprising a sulfate ion into the flowback water. A particularly useful reagent is sodium sulfate. Other useful reagents include, but are not limited to, aluminum sulfate, ammonium sulfate, magnesium sulfate, potassium sulfate, and sulfuric acid. The sulfate ion from the reagent reacts with the barium ion to form barium sulfate ($BaSO_4$). Barium sulfate is highly insoluble and precipitates out of solution rapidly. One advantage to the pre-concentration sequestration of barium by precipitating barium sulfate is that barium sulfate may be disposed of relatively inexpensively by depositing the barium sulfate in a landfill.

Barium sulfate will not leach from a landfill back into groundwater due to the high insolubility of barium sulfate, even in the presence of strong acids. In fact, in spite of barium's toxicity to humans, barium sulfate is used in the medical community to diagnose certain digestive tract illnesses because the barium sulfate shows up on x-rays and because the barium sulfate will not dissolve even in the presence of stomach acid. Thus, barium sulfate passes harmlessly though the digestive tract. This high insolubility of barium sulfate leads to solid waste containing barium sulfate passing the Toxicity Characteristic Leaching Procedure (TCLP) administered by the Environmental Protection Agency (EPA). The EPA requires certain wastes to pass the TCLP test before approving such wastes for disposal in landfills. Barium is one waste product required to pass the TCLP test. TCLP is one of the Federal EPA test methods that are used to exclude leachable toxic substances from landfills. The TCLP test is outlined in EPA publication SW-846, entitled "Test Methods for Evaluating Solid Waste, Physical/Chemical Methods," which is hereby incorporated by reference herein. If a substance passes the TCLP test, that substance is classified as non-hazardous and may be disposed of in a landfill. Another EPA test used to exclude potentially dangerous substances from landfills is the Paint Filter Test.

Referring again to FIGS. 1 and 2, to implement one of the barium removal methods described above, the concentrator section 120 may include a reagent inlet 187 that is connected to a supply of reagent in a tank 193 (e.g., sodium sulfate, sulfuric acid, aluminum sulfate, ammonium sulfate, magnesium sulfate, or potassium sulfate, etc.) by a reagent supply line 189. A reagent pump 191 may pressurize the reagent supply line 189 with reagent material from the tank 193 so that the reagent material is ejected into the concentrator section 120 (e.g., upstream of, or proximate to, the venturi 162) to mix with the exhaust gas from the flare 130 or generator and flowback water injected by the inlet 160. The reagent pump 191 may be operatively connected to the controller 302 (see FIG. 3) and the controller 302 may operate the reagent pump 191 to meter reagent based on gas and flowback water flow rates to ensure proper ratios and mixing. When mixed with the flowback water in the concentrator section 120, the reagent reacts with dissolved barium ions to form barium sulfate, which rapidly precipitates out of solution in solid form. Due to the ability of the concentrator 110 to handle very high levels of total solids, the precipitated barium sulfate is maintained in suspension and eventually ends up in the settling tank 183 along with other materials that make up a solid portion of the concentrated flowback water. Solid and liquid portions of the concentrated flowback water separate from one another in the settling tank 183. If the solid portions, which may contain up to about 20% liquid, need further separation, some of the solid portion may be drawn off from the settling tank 183 through line 221 and directed to a further separation device, such as a rotary belt vacuum filter 223. Liquid from the rotary belt vacuum filter 223 may be returned to the concentrator via line 225 into the sump 172 of the demister 122. Solids may be removed from the rotary belt vacuum filter 223 through an exit line 227 for disposal, for example in a landfill. Alternatively, solids removed from the rotary belt vacuum filter 223 may be purified and sold, for example to mining companies, as drilling mud.

Figure 4:
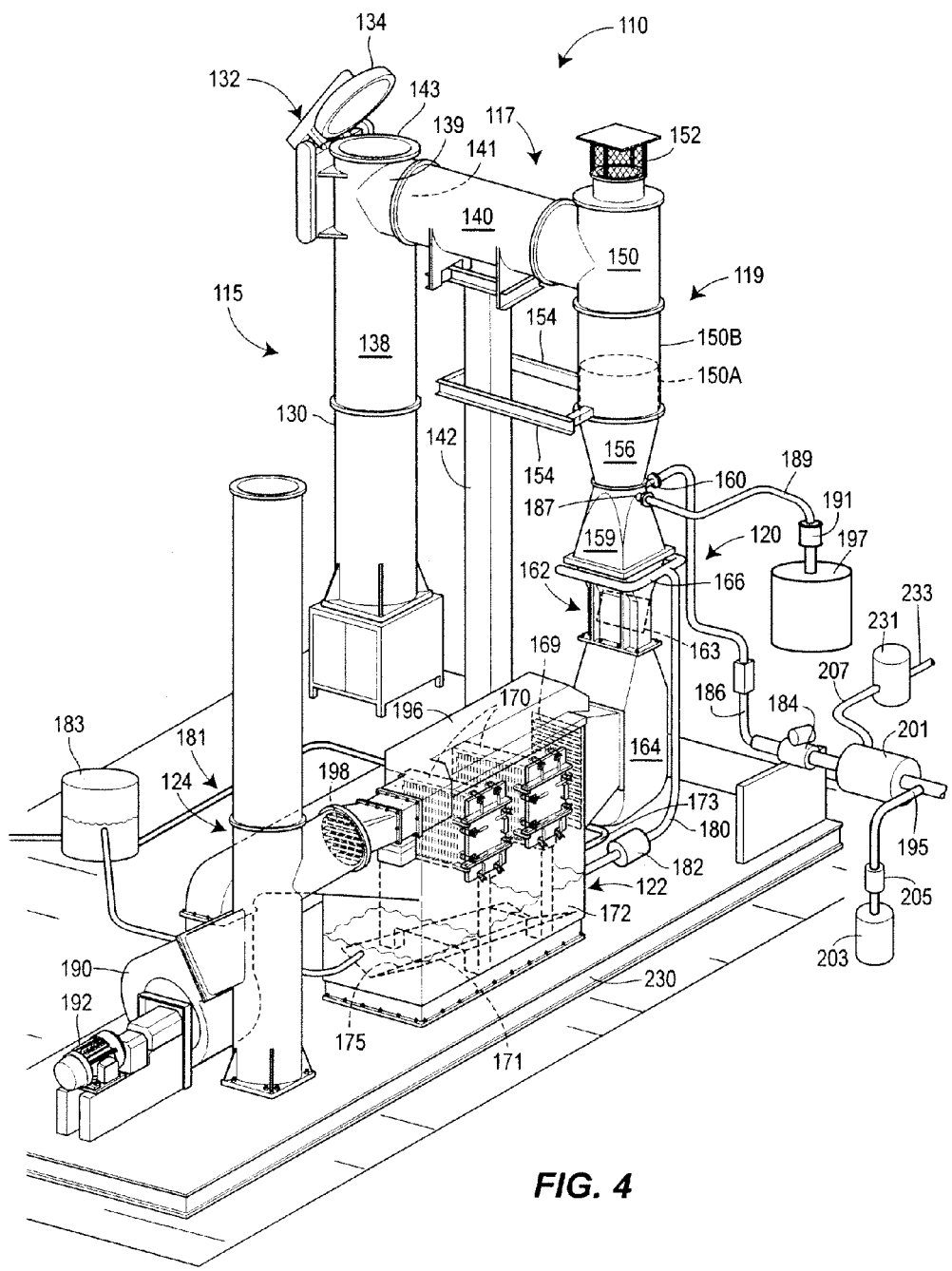
FIG. 4 is a perspective view of another embodiment of a compact liquid concentrator.

Alternatively, a pre-concentration sequestration process may involve mixing the reagent with the flowback water upstream of the flowback water inlet 160, for example in a sequential mixing and settling tank 201 (See FIG. 4). In this case, reagent material may be supplied to the sequential mixing and settling tank 201 from a supply of reagent material in a tank 203 via a reagent supply line 195. A reagent supply pump 205 may supply the reagent material under pressure to the sequential mixing and settling tank 201. The reagent supply pump 205 may be operatively connected to the controller 302 (see FIG. 3) and the controller 302 may operate the reagent supply pump 205 to meter reagent based on gas and flowback water flow rates to ensure proper ratios and mixing. Barium precipitates out of solution as barium sulfate, as described above, and may be drawn out of the mixing and settling tank 201 through a line 207, prior to introduction into the concentrator. The solid portion, which may include up to about 20% liquid, may be further separated in a solid/liquid separating device, such as a rotary belt vacuum filter 231 or other separating device. Thereafter, barium sulfate may be drawn off through a line 233 and may be further processed, purified, and sold, for example to drilling companies for use in drilling mud.

Because the reagent supplied to react with the dissolved barium ions may also react with other dissolved compounds in the flowback water, such as calcium, greater quantities of reagent may be needed than would otherwise be needed to react with the barium alone. For example, in some cases between approximately 150% and 600% more reagent may be mixed with the flowback water than would be required by the amount of barium in the flowback water alone. Preferably between 200% and 500% more reagent may be used, and more preferably approximately 400% more reagent may be used. By providing excess amounts of reagent, almost all dissolved barium will precipitate out of the flowback water. Some other dissolved reactive materials that may be found in flowback water include, calcium, magnesium, and strontium. In some cases, the product of the reagent reaction with these additional metals may result in commercially salable products. As a result, these additional products may also be drawn off through the line 233 for further processing. Alternatively, these additional products may simply be fed into the concentrator with the flowback water, as the concentrator is capable of handling large amounts of suspended solids, as described above.

Pre or Post Concentration Stabilization

Another way to remove barium from flowback water is to chemically or mechanically stabilize the barium either before or after the flowback water is concentrated. If the barium is not treated before concentration, the dissolved barium ions may react with other chemicals in the flowback water to form compounds that will precipitate out of solution when concentrations of the compounds reach saturation. Some of these barium compounds are water soluble and must be stabilized prior to extraction from the concentrator system. These barium compounds may be stabilized, for example, in the settling tank 183. The barium compounds may be mechanically or chemically stabilized. With mechanical stabilization, the barium compounds are incased in glass, or other crystalline structure so that the barium compounds cannot react with other materials, or cannot dissolve in solution. In chemical stabilization, a reagent is provided into the settling tank that reacts with the barium compounds to produce insoluble compounds. In either case, the stabilizing compound may be pumped into the settling tank 183 from a tank 211 (see FIG. 1) via a pipeline 213, for example. The stabilized compounds may be drawn out of the settling tank 183 via the extraction port 215. In this case, the stabilized barium compounds are insoluble and will not leach out in the presence of strong acids. As a result, the stabilized barium compounds will pass the TCLP test.

Alternatively, the stabilizing reagent may be added to the wastewater before the wastewater is introduced into the concentrator 110 through the wastewater inlet 160 using, for example, the concentrator of FIG. 4 by pumping stabilizing agent from the tank 203 into the mixing and settling tank 201. In this case, the stabilizing agent may prevent certain chemical reactions of the barium that would result in soluble barium compounds. The stabilizing agent could also be introduced into the concentrator 110 separately from the wastewater using, for example, the concentrator of FIG. 1 by pumping stabilizing agent from the tank 197 (FIG. 4) into port 199, so that the stabilizing agent and the wastewater mix in the concentrating section 120 of the concentrator 110. In these cases, the insoluble solids formed by reaction between the barium and the stabilizing agent ultimately end up in the settling tank 183, where the insoluble barium compounds may be further processed as described above.

Example Test Results

The following paragraphs describe actual test results of one embodiment of the disclosed concentrator when used to concentrate samples of flowback water containing dissolved barium. These test results are examples only and are not meant to limit the disclosed concentrator, or operation of the disclosed concentrator, in any way.

In a first test, the disclosed concentrator was used to concentrate flowback water from a natural gas well located in Pennsylvania. The chemical breakdown of the flowback water is listed below in Table 1.

TABLE 1

| | | |
|---|---|---|
| pH | | 4.85 |
| Conductivity | umohs/mm | |
| TS (filterable residue) | mg/l | 260,000 |
| SS | mg/l | 790 |
| Dissolved Solids | mg/l | 259,210 |
| Alkalinity (As $CaCO_3$) | | |
| Bicarbonate | mg/l | ND |
| Carbonate | mg/l | ND |
| Hydroxide | mg/l | ND |
| Total | mg/l | ND |
| Ammonia as N | mg/l | |
| Total Kjeldahl N | mg/l | |
| BOD (5 Day) | mg/l | 150 |
| COD | mg/l | 20,000 |
| TOC | mg/l | 1,250 |
| Anions | | |
| Chloride | mg/l | 160,000 |
| Flouride | mg/l | 0.22 |
| Nitrogen Nitrate as N | mg/l | |
| Total Ortho-Phosphate as P | mg/l | |
| Total Phosphorous | mg/l | |
| Sulfate | mg/l | ND |
| Sulfide | mg/l | |
| Metals (SW1311) | | |
| Aluminum | mg/l | |
| Antimony | mg/l | |
| Arsenic | mg/l | 0.022 |
| Barium | mg/l | 7,700 |
| Beryllium | mg/l | |
| Boron | mg/l | |
| Cadmium | mg/l | 0.0094 |
| Calcium | mg/l | |
| Cerium | mg/l | |
| Chromium | mg/l | 0.036 |
| Cobalt | mg/l | |
| Copper | mg/l | |
| Iron | mg/l | |
| Lead | mg/l | 0.025 |

TABLE 1-continued

| | | |
|---|---|---|
| Magnesium | mg/l | |
| Manganese | mg/l | |
| Molybdenum | mg/l | |
| Nickel | mg/l | |
| Potassium | mg/l | |
| Mercury | mg/l | ND |
| Radium | mg/l | |
| Selenium | mg/l | 0.34 |
| Silicon | mg/l | |
| Silver | mg/l | ND |
| Sodium | mg/l | |
| Strontium | mg/l | 6,400 |
| Thallium | mg/l | |
| Tin | mg/l | |
| Titanium | mg/l | |
| Tungsten | mg/l | |
| Vanadium | mg/l | |
| Zinc | mg/l | |
| Zirconium | mg/l | |

As illustrated in Table 1, the flowback sample included approximately 260,000 mg/l total solids (see line 3 of Table 1). After processing, a heavy slurry was extracted from the gravity settling tank including over 800,000 mg/l total solids. Supernatant liquid from the gravity settling tank was re-circulated into the concentrator as described above. The concentrator experienced no deleterious effects from scaling or blockages. Stack tests on the exhaust stack indicated that gaseous emissions remained within the permitted ranges established by local regulatory authorities. In other words, the disclosed concentrator does not significantly change the chemical makeup of gas emissions from existing exhaust stacks. As a result of this first test, the disclosed concentrator proved its ability to process liquids with extremely high levels of total solids.

Several more tests were conducted on the wastewater sample of Table 1. Two test runs are summarized below in Table 2, Test 2A and Test 2B. In Test 2A, the wastewater was pretreated with approximately 45 g/l of $Na_2SO_4$. During Test 2A the pH of the wastewater was varied from about 1 to about 4. In Test 2B, the wastewater was treated with approximately 22.5 g/l of $Na_2SO_4$ (or about half the amount of $Na_2SO_4$ of Test 2A) and the pH of the wastewater was varied from about 1 to about 4. The test results for Test 2A and 2B are summarized below in Table 2.

TABLE 2

| | | | Test 2A | | | | Test 2B | | | |
|---|---|---|---|---|---|---|---|---|---|---|
| Na2SO4 | g/l | Feed water | 45 | 45 | 45 | Ave | 22.5 | 22.5 | 22.5 | Ave |
| Target pH | | 5.08 | 1-2 | 2-3 | 3-4 | | 1-2 | 2-3 | 3-4 | |
| Barium | mg/L | 11000 | 0.50 | 0.36 | 160 | 54 | 2100 | 3900 | 4200 | 3400 |
| Calcium | mg/L | 20000 | 14000 | 14000 | 13000 | 13667 | 17000 | 16000 | 16000 | 16333 |
| Iron | mg/L | 120 | 50 | 25 | 16 | 30 | 55 | 19 | 15 | 30 |
| Magnesium | mg/L | 1400 | 1300 | 1400 | 1300 | 1333 | 1400 | 1300 | 1400 | 1367 |
| Potassium | mg/L | 290 | 230 | 230 | 210 | 223 | 240 | 240 | 230 | 237 |
| Sodium | mg/L | 46000 | 57000 | 57000 | 54000 | 56000 | 55000 | 53000 | 52000 | 53333 |
| Strontium | mg/L | 5400 | 1200 | 1300 | 1200 | 1233 | 3400 | 3500 | 3500 | 3467 |
| Sulfate | mg/L | | 2900 | 3300 | 3400 | 3200 | 110 | 0.00 | 0.00 | 37 |
| % Removed | | | | | | | | | | |
| Barium | | | 100% | 100% | 99% | 100% | 81% | 65% | 62% | 69% |
| Calcium | | | 30% | 30% | 35% | 32% | 15% | 20% | 20% | 18% |
| Iron | | | 58% | 79% | 87% | 75% | 54% | 84% | 88% | 75% |
| Magnesium | | | 7% | 0% | 7% | 5% | 0% | 7% | 0% | 2% |
| Potassium | | | 21% | 21% | 28% | 23% | 17% | 17% | 21% | 18% |
| Sodium | | | −24% | −24% | −17% | −22% | −20% | −15% | −13% | −16% |
| Strontium | | | 78% | 76% | 78% | 77% | 37% | 35% | 35% | 36% |
| Sulfate | | | | | | | | | | |
| Initial pH | | | 4.88 | 4.87 | 4.88 | 4.88 | 4.88 | 4.89 | 4.85 | 4.87 |
| 1N H2SO4 Added (mls) | | | 0.9 | 0.2 | 0.05 | 0.38 | 0.9 | 0.12 | 0.05 | 0.36 |
| pH after Acid Addition | | | 1.51 | 2.1 | 3.39 | 2.33 | 1.5 | 2.36 | 3.23 | 2.36 |
| pH after Sodium Sulfate Addition* | | | 1.69 | 2.32 | 3.59 | 2.53 | 1.56 | 2.48 | 3.33 | 2.46 |
| Amt Sodium Sulfate Added (g/100 mls feed) | | | 4.5 | 4.5 | 4.5 | 4.50 | 2.25 | 2.25 | 2.25 | 2.25 |
| Amount Acid added | mg | | 44 | 10 | 2 | 19 | 44 | 6 | 2 | 17 |
| Amount SO4 in H2SO4 | mg | | 43 | 10 | 2 | 18 | 43 | 6 | 2 | 17 |
| Amount SO4 in Na2SO4 | mg | | 3042 | 3042 | 3042 | 3042 | 1521 | 1521 | 1521 | 1521 |
| Total SO4 added | mg | | 3085 | 3052 | 3045 | 3061 | 1564 | 1527 | 1524 | 1538 |
| SO4 Required for Conversion of Removed Ba to BaSO4 | mg | | 771 | 771 | 760 | 767 | 624 | 498 | 476 | 533 |
| | % of SO4 added | | 25% | 25% | 25% | 25% | 40% | 33% | 31% | 35% |
| SO4 Required for Conversion of Removed Sr to SrSO4 | mg | | 460 | 449 | 460 | 457 | 219 | 208 | 208 | 212 |
| | % of SO4 added | | 15% | 15% | 15% | 15% | 14% | 14% | 14% | 14% |

TABLE 2-continued

|  |  |  | Test 2A | | | | Test 2B | | | |
| --- | --- | --- | --- | --- | --- | --- | --- | --- | --- | --- |
| Na2SO4 | g/l | Feed water | 45 | 45 | 45 | Ave | 22.5 | 22.5 | 22.5 | Ave |
| SO4 | mg |  | 1440 | 1440 | 1680 | 1520 | 720 | 960 | 960 | 880 |
| Required for Conversion of Removed Ca to CaSO4 | % of SO4 added |  | 47% | 47% | 55% | 50% | 46% | 63% | 63% | 57% |
| Sulfate in Removed Ba, Sr, Ca | % of SO4 added |  | 87% | 87% | 95% | 90% | 100% | 109% | 108% | 106% |
| Sulfate in Filtrate | mg |  | 290 | 330 | 340 | 320 | 11 | 0 | 0 | 4 |
|  | % of SO4 added |  | 9% | 11% | 11% | 10% | 1% | 0% | 0% | 0% |
| Sulfate in Removed of Ba, Sr, Ca + Filtrate | % Consumed |  | 97% | 98% | 106% | 101% | 103% | 110% | 108% | 107% |

As illustrated in Table 2, the wastewater feed contained approximately 11,000 mg/l of barium (see line 5 of Table 2). Almost all of the barium was precipitated out of solution with the addition of sodium sulfate in Test 2A. More particularly, at a pH of between 1 and 2, only 0.5 mg/l of barium remained in solution, at a pH of between 2 and 3, only 0.36 mg/l of barium remained in solution, and at a pH of between 3 and 4, only 160 mg/l of barium remained in solution (see line 5 of Table 2). Approximately 4 times the theoretical amount of sodium sulfate was mixed with the wastewater because the sulfate reacts also with other chemical compounds in the wastewater. The excess sodium sulfate ensures that virtually all of the barium precipitates out of solution, especially at lower pH levels.

During another test, one embodiment of the concentrator was used to concentrate wastewater from a known difficult-to-treat source of wastewater. The difficult-to-treat wastewater included the chemical makeup illustrated below in Table 3.

TABLE 3

| Analyte | Results | RLimit | Units |
| --- | --- | --- | --- |
| Chloride | 140000 | 1.0 | mg/L |
| Nitrogen, Ammonia (As N) | 150 | 2.0 | mg/L |
| pH | 5.38 | 0.0200 | pH Units |
| Specific Conductance | 195000 | 2.00 | umhos/cm |
| Specific Gravity | 1.15 | 0.0100 | T/4° C. |
| Sulfate | ND | 100 | mg/L |
| 2-Fluorobiphenyl | 38 | 10-67.1 | ug/mL |
| 2-Fluorophenol | 27.1 | 17.3-110 | ug/mL |
| Acenaphthene | 1.5 | 0.50 | µg/L |
| Fluoranthene | 0.95 | 0.50 | µg/L |
| Fluorene | 1.4 | 0.50 | µg/L |
| Naphthalene | 5.7 | 0.50 | µg/L |
| Nitrobenzene-d5 | 48.6 | 10-115 | ug/mL |
| Phenanthrene | 3.7 | 0.50 | µg/L |
| Phenol-d5 | 27.9 | 10-50.9 | ug/mL |
| Terphenyl-d14 | 12.4 | 10.1-131 | ug/mL |
| Total Dissolved Solids (Residue, Filterable) | 230000 | 20 | mg/L |
| Mercury | ND | 0.00020 | mg/L |
| Aluminum | 7.0 | 0.20 | mg/L |
| Antimony | ND | 0.020 | mg/L |
| Arsenic | ND | 0.010 | mg/L |
| Barium | 11000 | 2.0 | mg/L |
| Beryllium | 0.0086 | 0.0010 | mg/L |
| Boron | 5.3 | 0.020 | mg/L |
| Cadmium | 0.0055 | 0.0020 | mg/L |
| Calcium | 18000 | 500 | mg/L |
| Chromium | 0.039 | 0.0030 | mg/L |
| Cobalt | 1.3 | 0.0030 | mg/L |
| Copper | 0.064 | 0.010 | mg/L |

TABLE 3-continued

| Analyte | Results | RLimit | Units |
| --- | --- | --- | --- |
| Iron | 140 | 50 | mg/L |
| Lead | 0.15 | 0.0075 | mg/L |
| Lithium | 220 | 100 | mg/L |
| Magnesium | 1300 | 500 | mg/L |
| Manganese | 5.1 | 2.0 | mg/L |
| Molybdenum | ND | 0.020 | mg/L |
| Nickel | ND | 0.010 | mg/L |
| Phosphorus | 3.4 | 0.10 | mg/L |
| Potassium | 340 | 0.50 | mg/L |
| Selenium | 0.28 | 0.030 | mg/L |
| Silicon | 17 | 0.30 | mg/L |
| Silver | ND | 0.010 | mg/L |
| Sodium | 40000 | 500 | mg/L |
| Thallium | ND | 0.050 | mg/L |
| Tin | ND | 0.020 | mg/L |
| Vanadium | 14 | 8.0 | mg/L |
| Zinc | 0.12 | 0.020 | mg/L |
| Phosphorus, Total (As P) | 14 | 2.0 | mg/L |
| Sulfide | ND | 0.050 | mg/L |
| Total Suspended Solids | 1000 | 1.0 | mg/L |
| Turbidity | 850 | 5.0 | NTU |
| 1,2-Dichloroethane-d4 | 107 | 132 | µg/L |
| 2-Butanone | 45 | 10 | µg/L |
| 4-Bromofluorobenzene | 91 | 80-120 | µg/L |
| Acetone | 110 | 50 | µg/L |
| Dibromofluoromethane | 103 | 80-120 | µg/L |
| Ethylbenzene | 15 | 5.0 | µg/L |
| m,p-Xylene | 69 | 5.0 | µg/L |
| o-Xylene | 77 | 5.0 | µg/L |
| Toluene-d8 | 99 | 80-120 | µg/L |
| Total Xylenes | 150 | 5.0 | µg/L |

The wastewater was treated to zero liquid discharge and solids produced by the treatment process passed both the Paint Filter and TCLP tests. Results of the this test are summarized below in Table 4 in which results of several samples are listed. (e.g., sample IDs 01-09)

TABLE 4

| | | Sample ID | | | | | | |
|---|---|---|---|---|---|---|---|---|
| | | 01 Pretreatment Filtrate Current (Feed + 210 lb Sulfate) | 02 Pretreatment Filtrate After Acid Addition | 03 Pretreatment Filtrate After Adding 210 lb Sodium Sulfate Units | 04 and 05 Pretreatment Solid After Addition of All Acid + Sulfate | 06 Residual Filtrate | 08 and 09 Residual Solids | Test Procedure |
| | | mg/L | mg/L | mg/L | mg/L | mg/L | mg/L | |
| pH | pH | 5.84 | <0.160 | <0.050 | | <0.020 | | SW-846 9045C |
| Sulfate, Colorimetric | Sulfate | 100 | 180 | 860 | | 410 | | SW-846 9038 |
| Total Metals by ICP | Barium | 3400 | 6.3 | 13 | 46 | 89 | 220 | SW-846 6010B |
| Total Metals by ICP | Calcium | 23000 | 23000 | 16000 | 25000 | 39000 | 13000 | SW-846 6010B |
| Total Metals by ICP | Iron | 2.7 | 72 | 98 | 170 | 230 | 87 | SW-846 6010B |
| Total Metals by ICP | Magnesium | 2200 | 2100 | 2100 | 800 | 4700 | 1200 | SW-846 6010B |
| Total Metals by ICP | Potassium | 440 | 410 | 380 | ND | 950 | 330 | SW-846 6010B |
| Total Metals by ICP | Sodium | 55000 | 55000 | 59000 | 110000 | 39000 | 230000 | SW-846 6010B |
| Total Metals by ICP | Strontium | 5200 | 2300 | 730 | 1600 | 1300 | 6700 | SW-846 6010B |

In this test, sodium sulfate was again used as the pretreatment reagent. Concentrated wastewater was sent to a gravity settling tank. Solids were drawn out of the gravity settling tank and were further separated in a vacuum belt filtration system. This process yielded a zero liquid discharge rate from the concentrator. All supernatant liquid was recirculated through the concentrator as described above. The resultant solids passed both the Paint Filter and TCLP tests. Table 4 summarizes the chemical makeup of the solids before and after concentration. As illustrated above, barium levels were not reduced to zero in this test. However, current regulations allow up to 100 mg/l of detectable barium, thus the resultant solids passed the TCLP test.

With the barium level in pre-treated wastewater liquid feed at 46 mg/l (see line 6 of Table 4), solids that settled out of the feed liquid passed the TCLP with non-detectable amounts of barium. When pre-treated feed was passed through the concentrator and solids were removed from the vacuum belt filter, the liquid phase from which the solids were removed contained 220 mg/l of Barium (see line 6 of Table 4) while the collected solids passed both the Paint Filter Test and the TCLP test with non-detectable levels of barium.

While certain representative embodiments and details have been shown for purposes of illustrating the invention, it will be apparent to those skilled in the art that various changes in the methods and apparatus disclosed herein may be made without departing from the scope of the invention. For example, the disclosed concentrator may be used to scrub contaminants other than barium from wastewater. In particular, other contaminants may be scrubbed from wastewater by injecting a reagent from the reagent tank either into the wastewater upstream of wastewater injection into the venturi section, or into the venturi section simultaneously with the wastewater. Additionally, other contaminants may be chemically or mechanically stabilized by either injecting a reagent or stabilizing substance into the wastewater upstream of wastewater injection into the venturi section, or injecting a reagent or stabilizing substance into the settling tank.

The invention claimed is:

1. A process for removing contaminants from flowback water from a natural gas well, the process using a wastewater concentrator including a gas inlet, a gas outlet, a concentrating section between the gas inlet and the gas outlet, the concentrating section having a narrowed portion, the process comprising:
    mixing a reagent with liquid flowback water from a natural gas well, the reagent reacting with a soluble chemical compound in the liquid flowback water to form an insoluble chemical compound;
    combining a gas and the liquid flowback water in the concentrating section to form a mixture of gas and entrained liquid flowback water, the entrained liquid flowback water including the insoluble chemical compound;
    directing the combined gas and entrained liquid flowback water into a demister where at least some of the entrained liquid flowback water is removed from the gas and collected in a sump of the demister;
    removing a portion of the liquid flowback water in the sump of the demister and sending the portion of the liquid flowback water to a settling tank where suspended solids and insoluble chemical compounds in the liquid flowback water separate from liquid portions of the liquid wastewater;
    removing the separated solid portion from the settling tank and returning the separated liquid portion to the demister sump.

2. The process of claim 1, wherein the reagent is sodium sulfate.

3. The process of claim 2, wherein the soluble chemical compound is barium chloride.

4. The process of claim 3, wherein a sulfate ion from the sodium sulfate reacts with a barium ion from the barium chloride to form barium sulfate, which is highly insoluble.

5. The process of claim 1, wherein the reagent is stored in a reagent tank that is connected to a liquid flowback water inlet for injecting liquid flowback water into the concentrating section.

6. The process of claim 1, wherein the reagent is stored in a reagent tank that is connected to the concentrating section upstream of the narrowed portion.

7. The process of claim 1, wherein the separated solid portion removed from the settling tank is sent to a vacuum belt filtration system for further solid/liquid separation.

8. The process of claim 1, wherein the insoluble chemical compound is purified after removal from the settling tank.

9. The process of claim 8, wherein the purified insoluble chemical compound is sold for use in well drilling mud.

10. The process of claim 1, wherein a pump delivers reagent to the concentrating section, the pump delivering between approximately 150% and approximately 600% of the amount of reagent that would be needed to fully react with the soluble chemical compound.

11. The process of claim 10, wherein the pump delivers between approximately 200% and approximately 500% of the amount of reagent that would be needed to fully react with the soluble chemical compound.

12. The process of claim 11, wherein the pump delivers approximately 400% of the amount of reagent that would be needed to fully react with the soluble chemical compound.

13. The process of claim 1, wherein the liquid wastewater contains more than approximately 250,000 parts per million of dissolved solids.

14. A flowback concentrating and containment removal system for flowback water from natural gas wells, the system comprising:
   a gas inlet;
   a gas outlet;
   a concentrating section disposed between the gas inlet and the gas outlet, the concentrating section having a narrowed portion in which gas flow within the concentrating section accelerates;
   a liquid inlet through which flowback water is injected into the concentrating section, the liquid inlet being disposed in the concentrating section upstream of the narrowed portion;
   a demister disposed downstream of the narrowed portion, the demister removing entrained liquid droplets from the gas flow; and
   a reagent tank for holding a supply of reagent, the reagent tank being connected to the concentrating section to inject reagent into the concentrating section.

15. The system of claim 14, further comprising a reagent pump connected to the reagent tank.

16. The system of claim 15, wherein the reagent tank is connected to the liquid inlet.

17. The system of claim 15, wherein the reagent tank is connected to the concentrating section upstream of the narrowed portion.

18. The system of claim 15, wherein the entrained liquid droplets that are removed by the demister collect in a sump.

19. The system of claim 18, wherein the sump is connected to a settling tank and liquid and solid portions of the collected entrained liquid droplets separate from one another in the settling tank.

20. The system of claim 18, wherein the settling tank is connected to the sump with a return line that returns a liquid portion of the collected entrained liquid droplets to the sump.

* * * * *